(12) United States Patent
Hwang et al.

(10) Patent No.: US 11,107,033 B2
(45) Date of Patent: Aug. 31, 2021

(54) SYSTEMS AND METHODS FOR ELECTRONIC MONITORING OF INVENTORY TRANSFER

(71) Applicant: Coupang, Corp., Seoul (KR)

(72) Inventors: Ji Won Hwang, Seoul (KR); Seon Sook Hong, Seoul (KR); Jong Won Lee, Seoul (KR); Jin Won Jeong, Hanam (KR); Sang Min Jeon, Seongnam (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/550,916

(22) Filed: Aug. 26, 2019

(65) Prior Publication Data
US 2021/0065100 A1  Mar. 4, 2021

(51) Int. Cl.
  *G06Q 10/08* (2012.01)
  *G06K 19/06* (2006.01)
  *G06K 19/07* (2006.01)

(52) U.S. Cl.
  CPC ..... *G06Q 10/087* (2013.01); *G06K 19/06028* (2013.01); *G06K 19/0723* (2013.01);
  (Continued)

(58) Field of Classification Search
  CPC ............. G06Q 10/087; G06Q 10/0833; G06Q 10/08355; G06Q 10/0834; G06K 19/06028; G06K 19/0723
  (Continued)

(56) References Cited

U.S. PATENT DOCUMENTS

| 7,504,949 B1 | 3/2009 | Rouaix et al. |
| 2006/0020366 A1* | 1/2006 | Bloom ............... B07C 3/02 700/226 |

(Continued)

FOREIGN PATENT DOCUMENTS

KR  10-2006-0026226 A  3/2006

OTHER PUBLICATIONS

International Search Report in PCT/IB2020/056630, dated Oct. 20, 2020 (3 pages).
(Continued)

*Primary Examiner* — Russell S Glass
(74) *Attorney, Agent, or Firm* — Finnegan, Henderson, Farabow, Garrett & Dunner LLP

(57) ABSTRACT

The present disclosure provides systems and methods for monitoring inventory transfer in real-time, comprising a memory storing instructions and a processor configured to execute the instructions to receive a tote identifier associated with a tote configured to store one or more products and receive a container identifier associated with a container configured to store the tote. The processor is configured to receive, from a user device in the first fulfillment center, a code associated with a vehicle for transferring the container from a first to a second fulfillment center, receive, from a user device in the second fulfillment center, the code associated with the vehicle, receive, from the user device in the second fulfillment center, at least one of the container identifier or the tote identifier, and validate the transfer of the first product, based on the code and at least one of the container identifier or the tote identifier.

18 Claims, 16 Drawing Sheets

(52) U.S. Cl.
CPC ..... *G06Q 10/0833* (2013.01); *G06Q 10/0834* (2013.01); *G06Q 10/08355* (2013.01)

(58) Field of Classification Search
USPC .......................................................... 705/28
See application file for complete search history.

(56) References Cited

U.S. PATENT DOCUMENTS

| | | |
|---|---|---|
| 2008/0033849 A1 | 2/2008 | Rhea |
| 2013/0173435 A1* | 7/2013 | Cozad, Jr. ............ G06Q 10/087 705/28 |
| 2014/0129475 A1 | 5/2014 | Salvat, Jr. |
| 2014/0350717 A1 | 11/2014 | Dagle et al. |
| 2018/0218247 A1 | 8/2018 | Lee et al. |
| 2020/0151665 A1* | 5/2020 | Fitzgerald ............. H04W 4/029 |

OTHER PUBLICATIONS

Written Opinion of the International Searching Authority in PCT/IB2020/056630, dated Oct. 20, 2020 (6 pages).

\* cited by examiner

SYSTEMS AND METHODS FOR ELECTRONIC MONITORING OF INVENTORY TRANSFER

TECHNICAL FIELD

The present disclosure generally relates to computerized systems and methods for monitoring inventory transfer in real-time. In particular, embodiments of the present disclosure relate to inventive and unconventional systems related to monitoring transfer of products between fulfillment centers or warehouses, based on a code associated with a vehicle for transferring the products, a tote identifier associated with a tote for storing the products, and/or a container identifier associated with a container for storing the totes.

BACKGROUND

An inventory transfer process is as important as sales for online retailers. If an inventory transfer process between warehouses or fulfillment centers is challenging and takes a significant amount of time, delivery of products to customers may ultimately be delayed. This can lead to poor customer satisfaction, and a review from a dissatisfied customer may discourage potential purchases from other customers. However, an inventory transfer process may be costly to retailers in various ways. For example, retailers may incur shipping costs due to the need to transfer one or more products from one warehouse or fulfillment center to another. In addition, if one or more products need to be transferred between warehouses or fulfillment centers, this means that the one or more products will not be available for purchase by customers at least during the time the one or more products are being transferred to the next warehouse or fulfillment center. As such, the longer it takes to transfer a product, the less value the product has afterwards and the greater the loss for the retailers.

To mitigate such problems that may arise during an inventory transfer process, conventional inventory transfer systems may build a list of products and a number of each product to be transferred and manually fill out a transfer-out report to indicate that the products have been transferred out and are no longer available for purchase by customers. Afterwards, when the products arrive at the destination warehouse, another worker may manually fill out a transfer-in report or a transit report to indicate that the products have been received into stock at the destination warehouse. However, manually filling in reports to facilitate inventory transfer of products may be time consuming. As such, the time it takes to complete an inventory transfer process my increase, thereby decreasing a retailer's sale and profit and increasing the shipment and delivery time of products to customers.

Therefore, there is a need for improved systems and methods for monitoring inventory transfer between warehouses or fulfillment centers. In particular, there is a need for improved systems and methods for monitoring inventory transfer that is capable of updating a database with timestamps of receiving a code associated with a vehicle for transferring the products. Based on the timestamps received and stored in the database, the system may be able to validate a transfer of the products from a first fulfillment center to a second fulfillment center, without having the workers manually fill out reports. As such, the time it takes for products to be transferred between warehouses or fulfillment centers may decrease.

SUMMARY

One aspect of the present disclosure is directed to a computer-implemented system for monitoring inventory transfer in real-time. The system may comprise a memory storing instructions and at least one processor configured to execute the instructions. The at least one processor may be configured to execute the instructions to receive, from a user device in a first fulfillment center, a tote identifier associated with a tote configured to store one or more products for transfer, receive, from the user device in the first fulfillment center, a selection of a first zone and a first aisle within the first zone to pick one or more products for transfer, send for display for the user device in the first fulfillment center a first product and an expected quantity of the first product for picking at the first aisle, receive, from the user device in the first fulfillment center, a product identifier associated with the first product and a physical quantity of the first product for storing in the tote, modify a database to assign the product identifier and the physical quantity to the tote identifier, receive, from the user device in the first fulfillment center, a container identifier associated with a container configured to store the tote, modify the database to assign the tote identifier to the container identifier, receive, from the user device in the first fulfillment center, a code associated with a vehicle for transferring the container from the first fulfillment center to the second fulfillment center, modify the database to assign the tote identifier and the container identifier to the code associated with the vehicle, modify the database to assign a first timestamp of receiving the code from the user device in the first fulfillment center to the code, receive, from a user device in the second fulfillment center, the code associated with the vehicle, modify the database to assign a second timestamp of receiving the code from the user device in the second fulfillment center to the code, receive, from the user device in the second fulfillment center, at least one of the container identifier or the tote identifier, and validate the transfer of the first product from the first fulfillment center to the second fulfillment center, based on the code and at least one of the container identifier or the tote identifier received from the user device in the second fulfillment center.

In some embodiments, the at least one processor may be further configured to execute the instructions to prompt the user of the user device in the first fulfillment center to scan a location identifier associated with the first zone before receiving the product identifier associated with the first product and the physical quantity of the first product for storing in the tote. In some embodiments, the at least one processor may be further configured to execute the instructions to receive, from the user device in the first fulfillment center, a notification that the location identifier associated with the first zone cannot be scanned, and send for display for the user device in the first fulfillment center a notification to move to a second zone different from the first zone. In some embodiments, the at least one processor may be further configured to modify the database to assign a location identifier error to the first zone.

In some embodiments, when the physical quantity of the product and the expected quantity of the product are different, the at least one processor may be further configured to prompt the user of the user device in the first fulfillment center to identify a cause for the difference, and modify the database to assign the cause to at least one of the product identifier or the tote identifier. In some embodiments, the cause for the difference may comprise at least one of a lack of the product in the first zone, a lack of capacity in the tote, or a product damage. In some embodiments, the at least one processor may be further configured to execute the instructions to send for display for the user device in the first fulfillment center, a list of all tote identifiers assigned to the container identifier.

In some embodiments, after receiving the tote identifier from the user device in the first fulfillment center, the at least one processor may be further configured to execute the instructions to modify the database to assign the second fulfillment center as a final destination to the tote identifier. In other embodiments, after receiving the container identifier from the user device in the first fulfillment center, the at least one processor may be further configured to execute the instructions to modify the database to assign the second fulfillment center as a final destination to the container identifier. In some embodiments, modifying the database to assign the tote identifier to the container identifier may comprise comparing the final destination associated with the tote identifier and the final destination associated with the container identifier, and modifying the database to assign the tote identifier to the container identifier when the final destination associated with the tote identifier and the final destination associated with the container identifier are identical.

Another aspect of the present disclosure is directed to a computer-implemented method for monitoring inventory transfer in real-time. The method may comprise receiving, from a user device in a first fulfillment center, a tote identifier associated with a tote configured to store one or more products for transfer, receiving, from the user device in the first fulfillment center, a selection of a first zone and a first aisle within the first zone to pick one or more products for transfer, sending for display to the user device in the first fulfillment center a first product and an expected quantity of the first product for picking at the first aisle, receiving, from the user device in the first fulfillment center, a product identifier associated with the first product and a physical quantity of the first product for storing in the tote, modifying a database to assign the product identifier and the physical quantity to the tote identifier, receiving, from the user device in the first fulfillment center, a container identifier associated with a container configured to store the tote, modifying the database to assign the tote identifier to the container identifier, receiving, from the user device in the first fulfillment center, a code associated with a vehicle for transferring the container from the first fulfillment center to the second fulfillment center, modifying the database to assign the tote identifier and the container identifier to the code associated with the vehicle, modifying the database to assign a first timestamp of receiving the code from the user device in the first fulfillment center to the code, receiving, from a user device in the second fulfillment center, the code associated with the vehicle, modifying the database to assign a second timestamp of receiving the code from the user device in the second fulfillment center to the code, receiving, from the user device in the second fulfillment center, at least one of the container identifier or the tote identifier, and validating the transfer of the first product from the first fulfillment center to the second fulfillment center, based on the code and at least one of the container identifier or the tote identifier received from the user device in the second fulfillment center.

In some embodiments, the method may further comprise prompting the user of the user device in the first fulfillment center to scan a location identifier associated with the first zone before receiving the product identifier associated with the first product and the physical quantity of the first product for storing in the tote. In some embodiments, the method may further comprise receiving, from the user device in the first fulfillment center, a notification that the location identifier associated with the first zone cannot be scanned, sending for display to the user device in the first fulfillment center a notification to move to a second zone different from the first zone, and modifying the database to assign a location identifier error to the first zone. In other embodiments, when the physical quantity of the product and the expected quantity of the product are different, the method may further comprise prompting the user of the user device in the first fulfillment center to identify a cause for the difference, and modifying the database to assign the cause to at least one of the product identifier or the tote identifier. In some embodiments, the cause for the difference may comprise at least one of a lack of the product in the first zone, a lack of capacity in the tote, or a product damage.

In some embodiments, sending for display to the user device in the first fulfillment center a list of all tote identifiers assigned to the container identifier. In other embodiments, the method may comprise modifying the database to assign the second fulfillment center as a final destination to the tote identifier after receiving the tote identifier from the user device in the first fulfillment center. In some embodiments, the method may comprise modifying the database to assign the second fulfillment center as a final destination to the container identifier after receiving the container identifier from the user device in the first fulfillment center. In some embodiments, modifying the database to assign the tote identifier to the container identifier may comprise comparing the final destination associated with the tote identifier and the final destination associated with the container identifier, and modifying the database to assign the tote identifier to the container identifier when the final destination associated with the tote identifier and the final destination associated with the container identifier are identical.

Yet another aspect of the present disclosure is directed to a computer-implemented system for monitoring inventory transfer in real-time. The system may comprise a first user device in a first fulfillment center, a second user device in a second fulfillment center, a memory storing instructions and at least one processor configured to execute the instructions. The first user device may be configured to display zones in the first fulfillment center, aisles in each zone, and an expected quantity of products to be picked in each aisle. The at least one processor may be configured to execute the instructions to receive, from the first user device, a tote identifier associated with a tote configured to store one or more products for transfer, modify the database to assign the second fulfillment center as a final destination to the tote identifier, receive, from the first user device, a selection of a first zone and a first aisle within the first zone to pick one or more products for transfer, send for display to the first user device a first product and an expected quantity of the first product for picking at the first aisle, receive, from the first user device, a product identifier associated with the first product and a physical quantity of the first product for storing in the tote, modify a database to assign the product identifier and the physical quantity to the tote identifier, receive, from the first user device, a container identifier associated with a container configured to store the tote, modify the database to assign the second fulfillment center as a final destination to the container identifier, and modify the database to assign the tote identifier to the container identifier. Modifying the database to assign the tote identifier to the container identifier may comprise comparing the final destination associated with the tote identifier and the final destination associated with the container identifier, and modifying the database to assign the tote identifier to the container identifier when the final destination associated with the tote identifier and the final destination associated with the container identifier are identical. The at least one processor may also be configured to receive, from the first user device, a code associated with a vehicle for transferring the container from the first fulfillment center to the second fulfillment center, modify the database to assign the tote identifier and the container identifier to the code associated with the vehicle, modify the database to assign a first timestamp of receiving the code from the user device in the first fulfillment center to the code, receive, from the second user device, the code associated with the vehicle, modify the database to assign a second timestamp of receiving the code from the second user device to the code, receive, from the second user device, at least one of the container identifier or the tote identifier, and validate the transfer of the first product from the first fulfillment center to the second fulfillment center, based on the code and at least one of the container identifier or the tote identifier received from the second user device.

Other systems, methods, and computer-readable media are also discussed herein.

DETAILED DESCRIPTION

Figure 1A:
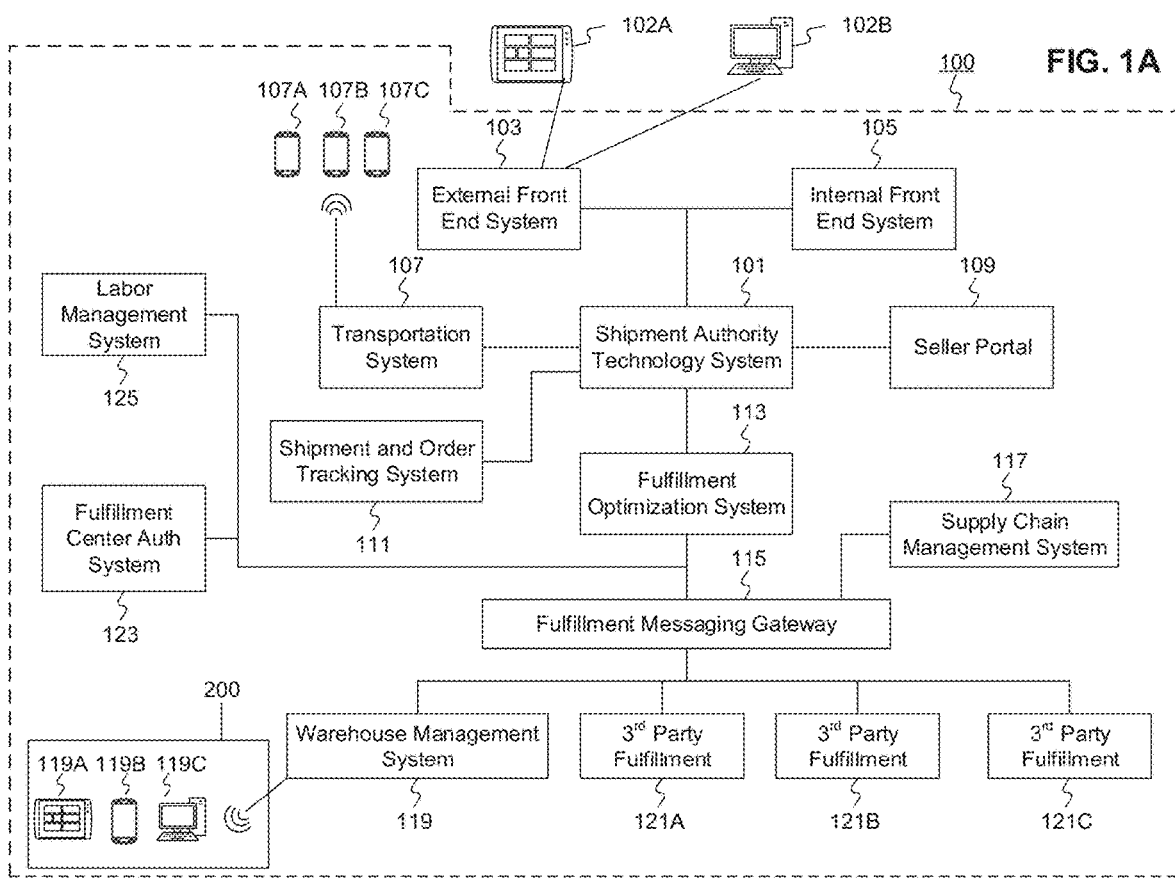
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for monitoring inventory transfer between fulfillment centers.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
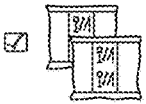
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 1196, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
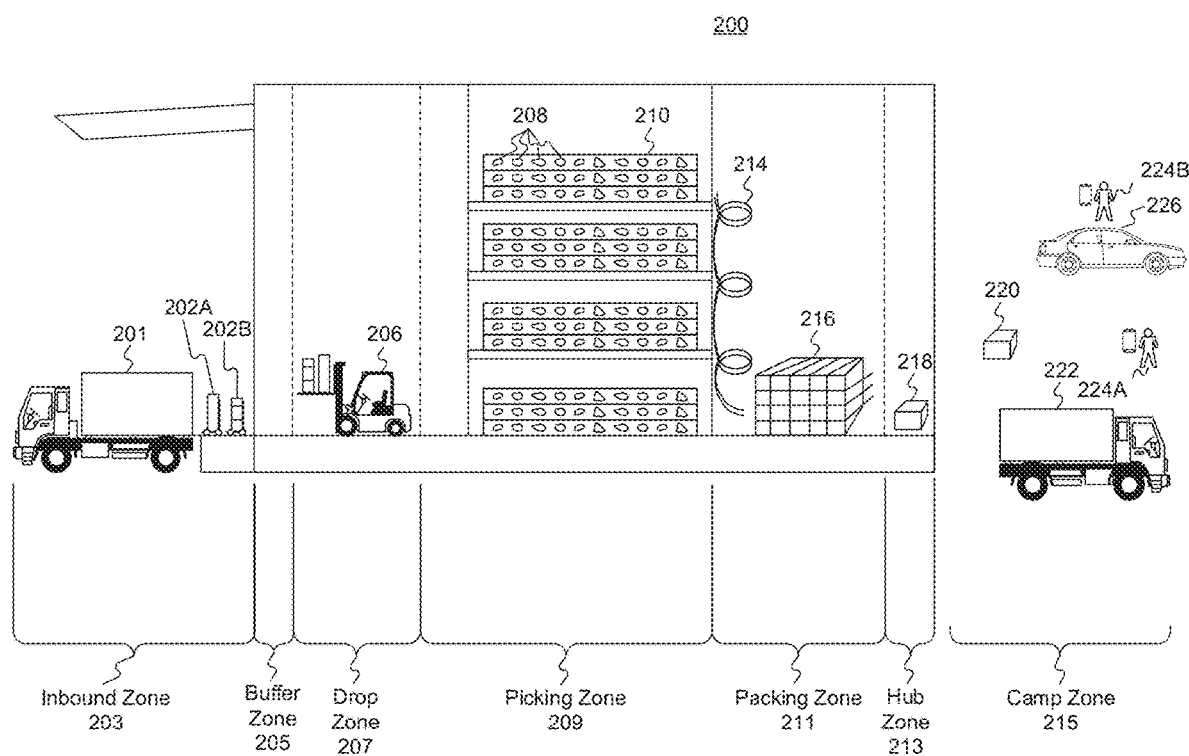
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
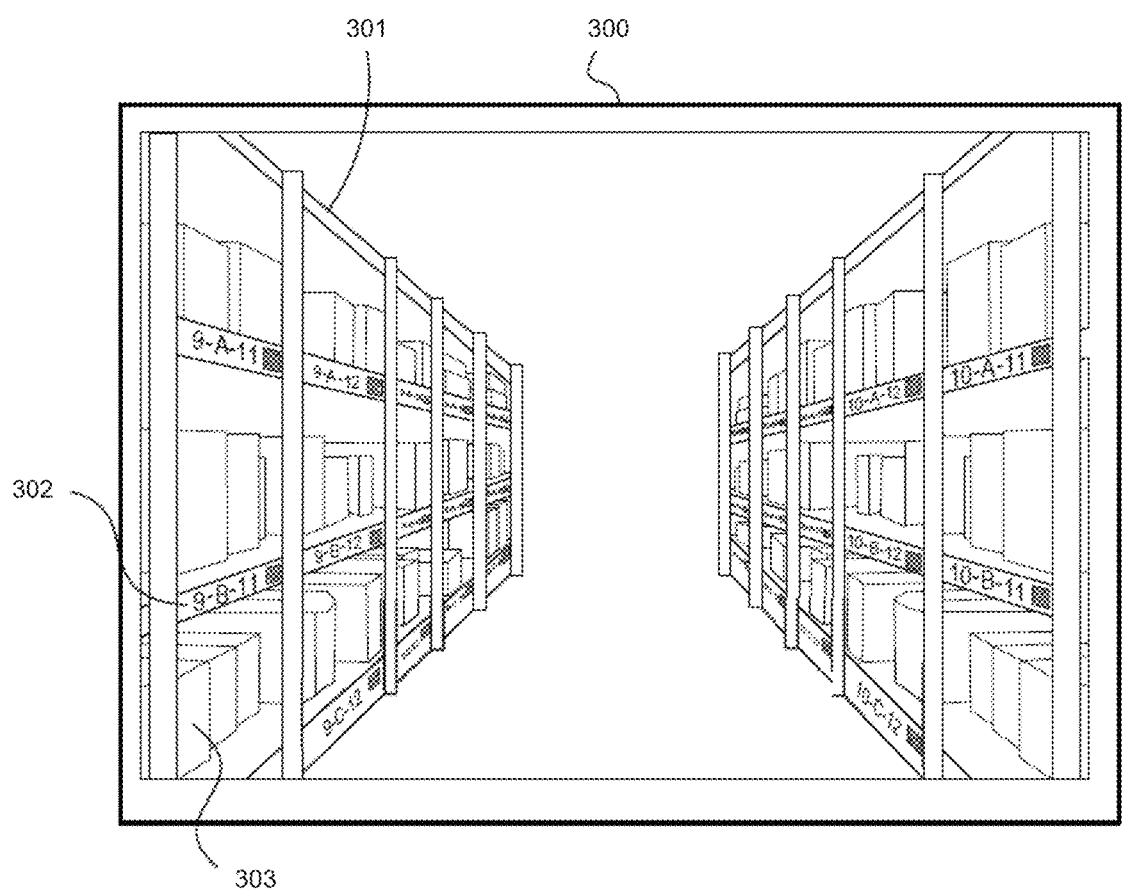
FIG. 3 is a diagrammatic illustration of an exemplary zone configured to receive inbound products, consistent with the disclosed embodiments.

FIG. 3 illustrates a zone 300 in accordance with the disclosed embodiments. As shown in FIG. 3, zone 300 may be in a warehouse, such as FC 200. Zone 300 may comprise a picking zone, such as picking zone 209 of FIG. 2, or a buffer zone, such as buffer zone 205 of FIG. 2. In zone 300, products 303 may be stored in storage units 301, which may include physical location identifiers 302. Storage units 301, in some embodiments, may be physical helving, bookshelves, boxes, totes, refrigerators, freezers, cold stores, or the like. Inbound products 303, in some embodiments, may a subject to sale and may be picked by a user (such as worker) or machine, or when a customer places an order for products 303 via a website hosted by external front end system 103. Physical location identifiers 302, in some embodiments, may be a unique address of a particular location of storage units 301.

In some embodiments, storage units 301, such as shelving, may have physical location identifiers 302 attached to it. Physical location identifiers 302 may be a unique address of a particular location of storage units 301. In some embodiments, physical location identifier 302 may indicate a particular product that is shelved at the location. But in other embodiments, physical location identifier 302 may indicate multiple products that are shelved together or closely together. Physical location identifier 302 may be an item barcode, RFID tag, or a matrix barcode, such as a Quick Response (QR) code. A camera or a scanner in a user device, such as a mobile device 119B, may scan physical location identifier 302 using an input device, such as an imaging device including a camera or a scanner. The scanned information may be sent to WMS 119. Based on the scanned information, WMS 119 may determine whether a user is at a location that is designated by WMS 119.

A batch may include one or more products. A user, such as a stowing worker, may pick products included in an assigned batch in zone 300, until every product in the batch is picked. In some embodiments, a user may pick products in zone 300 that the user is prompted to pick by WMS 119. For example, WMS 119 may indicate, on a user device, one or more products that the user needs to pick, as well as a quantity of the one or more products the user needs to pick in zone 300. A user may move in zone 300, such as a warehouse, on foot. In some embodiments, users may use other devices that assist movement such as a scooter, a robot and/or vehicles.

In some embodiments, a user device may assist a user to find a designated location. In some embodiments, a mobile device may show a user a map with navigation. For example, the mobile device may inform a user to turn left upon reaching a certain location. In some embodiments, a mobile device may provide a signal, including, but not limited to a map, sound, vibration or text message for assisting users to find a designated location.

Figure 4:
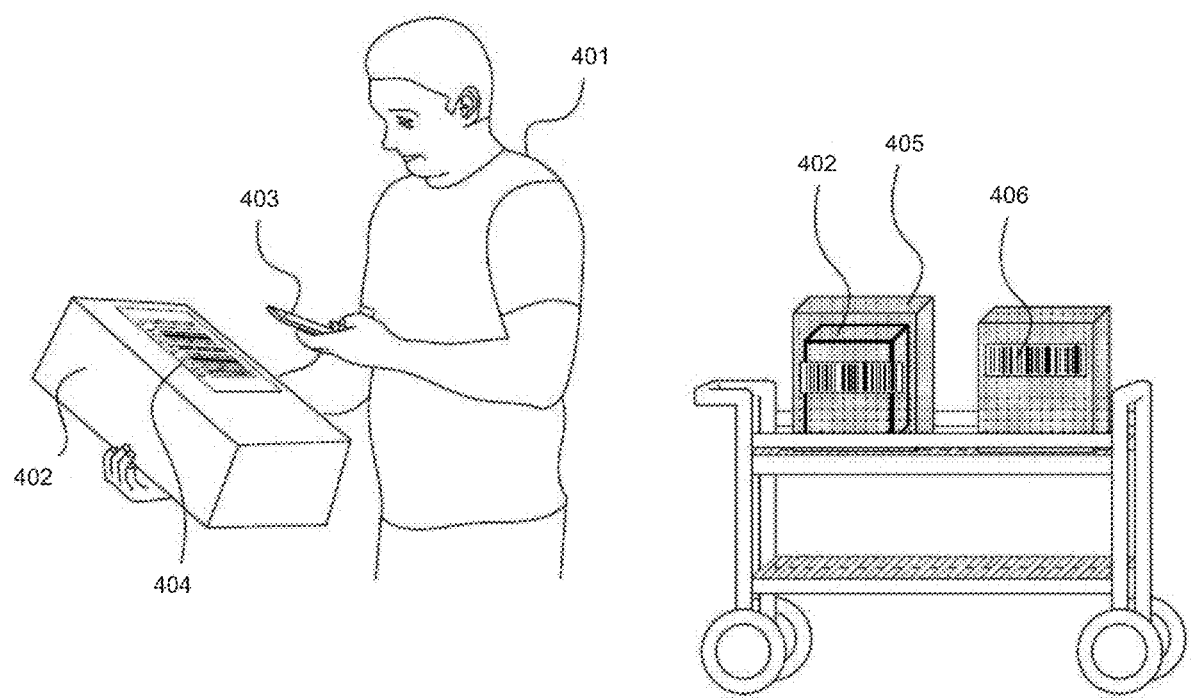
FIG. 4 is a diagrammatic illustration of an exemplary operation of a stowing worker in a zone, consistent with the disclosed embodiments.

FIG. 4 illustrates a picking operation of a user 401, such as a worker, in zone 300 as shown in FIG. 3. In some embodiments, products 402 may have product identifiers 404 attached to the products 402. Additionally or alternatively, product identifiers 404 may not be attached to the products 402, but instead, may be located near the products 402. Product identifiers 404 may comprise one or more of an item barcode, a stocking keeping unit (SKU), an RFID tag, a matrix barcode, such as Quick Response (QR) code, or the like.

A camera or a scanner in a user device, such as mobile device 403, may scan product identifier 404. Mobile device 403 may be implemented as mobile device 119B of FIG. 1A. The scanned information may be transmitted to WMS 119 via wireless or wired network. Based on the received information, WMS 119 may confirm whether the scanned product identifier 404 matches product identifier information stored in WMS 119. When WMS 119 confirms that it matches, a mobile device 119B may display to a user an instruction to pick product 402 and put the product 402 into a container 405. In some embodiments, instead of putting the product 402 into a container 405, the user may be instructed to pick product 402 and put product 402 into a tote (not shown). In some embodiments, the tote may be placed into a container 405.

In some embodiments, containers 405 may have container identifiers 406 attached to the containers 405. Additionally or alternatively, container identifiers 406 may not be attached to the containers 405, but instead, may be located near the containers 405. Container identifiers 406 may comprise one or more of an item barcode, an RFID tag, a matrix barcode, such as Quick Response (QR) code, or the like.

After the last product 402 is picked, a user, such as a worker, may move the containers 405 to a destination location, in accordance with an instruction displayed in a mobile device 119B. For example, a worker may scan destination identifier by scanning a destination barcode and transmit the scanned information to WMS 119. WMS 119 may share the scanned information with other systems, such as FO system 113 in fulfillment center via wireless or wired network. The destination location may comprise, for example, another FC 200, to which the products 402 and/or containers 405 need to be transferred. In other embodiments, the destination location may comprise a location within FC 200, to which the products and/or containers need to be sent in order to load the products 402 and/or containers 405 onto a vehicle for transfer to another FC 200.

Figure 5:
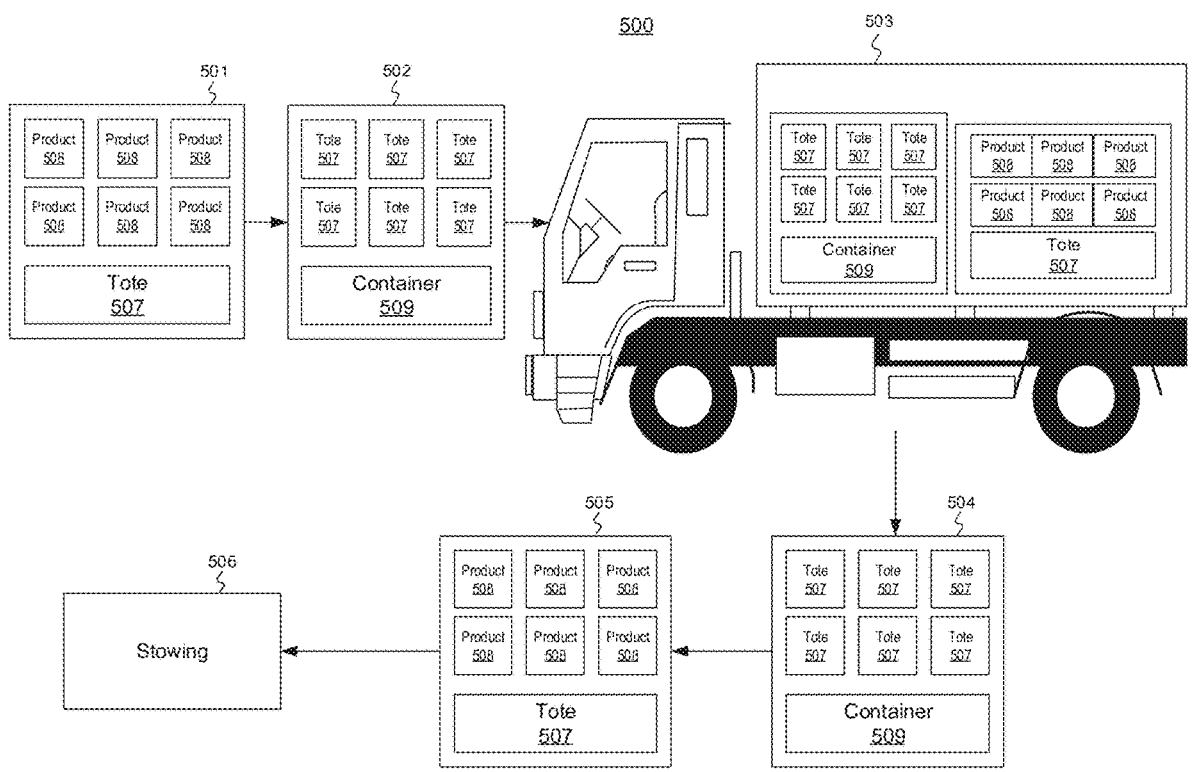
FIG. 5 is a diagrammatic illustration of an exemplary method of transferring products between fulfillment centers, consistent with the disclosed embodiments.

FIG. 5 is a diagrammatic illustration of an exemplary method 500 of transferring products between fulfillment centers, such as FC 200, consistent with the disclosed embodiments. At 501, a user, such as user 401, may pick one or more products 508 from a zone, such as zone 300, within a first FC 200. As discussed with reference to FIG. 4, in order to pick products 508 from the zone, the user may use a user device, such as mobile device 403, to scan a product identifier, such as product identifier 404, associated with each product 508. A camera or a scanner in a user device, such as mobile device 403, may scan product identifier 404 associated with each product 508. Then, the WMS 119, for example, may instruct the user to place each product 508 picked in a tote 507. For example, one or more processors in WMS 119 may display instructions, on mobile device 403, to place the picked products 508 in tote 507 until tote 507 is full. Each tote 507 may have a capacity, such as a maximum number of products 508 it can hold. In some embodiments, tote 507 may have a tote identifier (not shown) attached to the tote 507. Additionally or alternatively, the tote identifier may not be attached to the tote 507, but instead, may be located near the tote 507. Tote identifiers may comprise one or more of an item barcode, an RFID tag, a matrix barcode, such as Quick Response (QR) code, or the like.

Once every product 508 for transfer is picked and placed into tote 507, at block 502, each tote 507 storing products 508 for transfer may be placed in a container 509. Additionally or alternatively, totes 507 may be transferred without being placed into a container 509. For example, in some embodiments, block 502 may be skipped, and totes 507 may be loaded onto a vehicle for transfer, at block 503, without being placed in container 509. In other embodiments, for ease of transfer, totes 507 may be grouped together and placed in container 509. As discussed above, containers 509 may have container identifiers, such as container identifiers 406, attached to the containers 509. Additionally or alternatively, the container identifiers may not be attached to the containers 509, but instead, may be located near the containers 509. Container identifiers may comprise one or more of an item barcode, an RFID tag, a matrix barcode, such as Quick Response (QR) code, or the like.

In some embodiments, each tote 507 may be assigned to a starting FC 200 and a destination FC 200 in a database by WMS 119. In some embodiments, each container 509 may also be assigned to a starting FC 200 and a destination FC 200 in the database by WMS 119. Starting FC 200 may comprise an FC 200, at which the tote 507 and/or the container 509 is currently located for picking and storing products 508. Destination FC 200 may comprise an FC 200, to which the picked products 508 need to be transferred. When one or more totes 507 are placed in a container 509, the database may be modified by WMS 119 to assign the tote identifiers associated with each tote 507 to a container identifier associated with the container 509. In order to assign the tote identifiers to the container identifier in the database, at least the destination FC 200 assigned to the tote 507 (or respective tote identifiers) and the container 509 (or respective container identifiers) may need to match. That is, the destination FC 200 for each tote 507 and the container 509 may need to be the same so that the tote 507 can be stored in the container 509.

Once one or more totes 507 are stored in container 509, container 509 may then be loaded onto a vehicle at block 503. As discussed above and as seen in block 503, totes 507 may also be loaded onto a vehicle for transfer without being placed in container 509. The vehicle may be associated with a code that identifies the vehicle. For example, the code may comprise numbers, letters, words, special characters, symbols, images, or any combination thereof that is specific to each vehicle and that identifies each vehicle. Once one or more containers 509 are loaded onto the vehicle, the code associated with the vehicle may be assigned to the one or more containers 509 (or respective container identifiers) in the database. As such, when a user looks up the code associated with the vehicle in the database, the user may be able to retrieve the list of containers 509, totes 507, and/or products 508 loaded onto the vehicle at block 503. The vehicle may transfer the containers 509, totes 507, and the products 508 from the starting FC 200 to the destination FC 200.

At block 504, the vehicle may arrive at the destination FC 200, and containers 509 loaded onto the vehicle may be unloaded at the destination FC 200. In some embodiments, a user, such as a worker, at the destination FC 200 may input, on a user device, the code associated with the vehicle. As discussed in detail below, after receiving the code associated with the vehicle at the destination FC 200, the database may be modified to indicate that the vehicle has arrived at the destination FC 200. In some embodiments, the user at the destination FC 200 may scan a container identifier associated with each container 509 in order to update the location of the container 509 in the database. Then, at block 505, one or more totes 507 stored in each container 509 may be taken out. Similarly, the user at the destination FC 200 may scan a tote identifier associated with each tote 507 in order to update the location of the tote 507 in the database. Then, one or more products 508 stored in each tote 507 may be taken out from each tote 507, at block 506, for stowing. For example, the user at the destination FC 200 may begin scanning product identifiers associated with each product 508 to confirm receipt of each product 508 at the destination FC 200. Then, one or more users, such as workers, at the destination FC 200 may begin stowing the inbound products 508 in one or more storage units 301 in one or more zones 300 within the destination FC 200.

Figure 6:
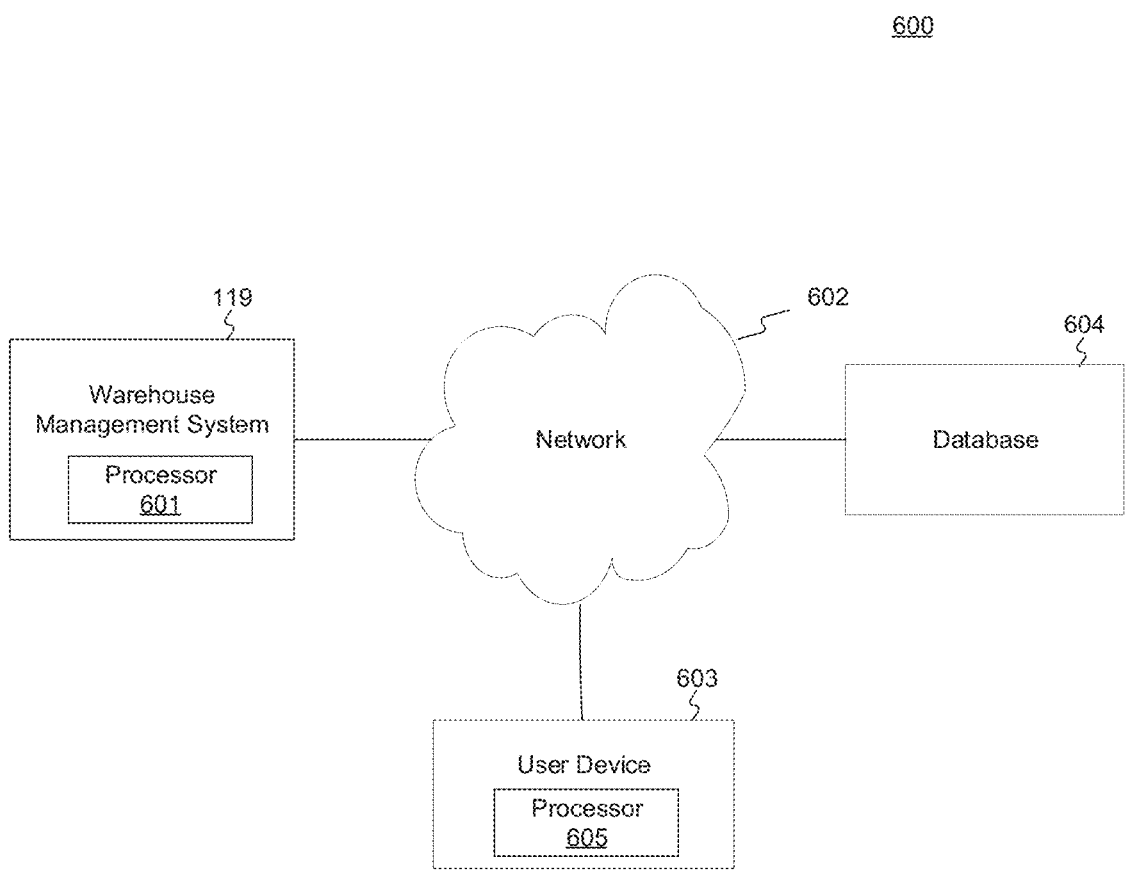
FIG. 6 is a schematic block diagram illustrating an exemplary embodiment of a system comprising a warehouse management system for monitoring inventory transfer, consistent with the disclosed embodiments.

Referring to FIG. 6, a schematic block diagram 600 illustrating an exemplary embodiment of a system comprising warehouse management system 119 for managing and monitoring inventory transfer from one FC 200 to another FC 200. Warehouse management system 119, in some embodiments, may be implemented as a computer system that receives a request for inventory transfer and facilitates inventory transfer from one FC 200 to another FC 200. In addition, warehouse management system 119 may also monitor inventory transfer of products from one FC 200 to another FC 200 to ensure that products are properly and timely transferred. In some embodiments, warehouse management system 119 may include one or more processors 601, which may receive a request for inventory transfer from a first FC 200 to a second FC 200. One or more processors 601 may communicate with a user device in the first FC 200 to facilitate inventory transfer. For example, in some embodiments, one or more processors 601 may display instructions, on the user device, for a user, such as a worker to begin picking one or more products for transfer from the first FC 200. In some embodiments, one or more processors 601 may also receive, from the user device, a tote identifier associated with a tote configured to store the products and/or a product identifier associated with each product. One or more processors 601 may also display instructions, on the user device, for the user to pack one or more products and/or totes into a container for transfer to the second FC 200. One or more processors 601 may further receive a code associated with a vehicle for transferring the one or more products from the first FC 200 to the second FC 200. In some embodiments, one or more processors 601 may receive the code from a user device in the first FC 200 when the vehicle departs from the first FC 200 and also from a user device in the second FC 200 when the vehicle arrives at the second FC 200. The code associated with the vehicle may be attached to the vehicle or placed near the vehicle. In some embodiments, for example, the code may comprise a license plate number of the vehicle. One or more processors 601 may modify a database, such as database 604, to assign a first timestamp of receiving the code from the user device in the first FC 200 and a second timestamp of receiving the code from the user device in the second FC 200. As such, WMS 119 may be able to monitor and validate the transfer of one or more products between FCs 200.

In some embodiments, one or more processors 601 may be configured to modify a database, such as database 604, to store information associated with the inventory transfer. By way of example, database 604 may store information associated with each inventory transfer of one or more products, including but not limited to, a product identifier associated with each product transferred, a tote identifier associated with each tote used to transfer one or more products, a container identifier associated with each container used to transfer one or more products and/or totes, and a code associated with a vehicle for transferring one or more products. Database 604 may further store other information associated with each product, including but not limited to product identifier associated with each product, expected quantity of each product for transfer, physical quantity of each product for transfer, location identifier associated with each product, a timestamp of transferring each product, a timestamp of receiving transfer of each product, and any transfer error that occurs during the process of transferring each product between FCs 200. Database 604 may include one or more memory devices that store information and are accessed through network 602. By way of example, database 604 may include Oracle™ databases, Sybase™ databases, or other relational databases or non-relational databases, such as Hadoop sequence files, HBase, or Cassandra. While database 604 is illustrated as being included in the system 600, it may alternatively be located remotely from system 600. In other embodiments, database 604 may be incorporated into warehouse management system 119 and/or user device 603. Database 604 may include computing components (e.g., database management system, database server, etc.) configured to receive and process requests for data stored in memory devices of database 604 and to provide data from database 604.

In some embodiments, one or more processors 601 may receive, from a user device, such as user device 603, a selection of a first zone and a first aisle within the first zone at which a user will begin a picking operation of one or more products for transfer. One or more processors 601 may display a first product and an expected quantity of the first product for picking at the selected first aisle on user device 603, via network 602. In some embodiments, one or more processors 601 may receive, from user device 603, a product identifier associated with the first product and a physical quantity of the first product for storing in the tote, via network 602. After receiving the product identifier, one or more processors 601 may modify a database, such as database 604, to assign the product identifier and the physical quantity to the tote identifier. As such, when the tote identifier is scanned, for example by a remote device (not shown) in WMS 119, one or more processors 601 may retrieve a list of products stored in the tote and a physical quantity of each product stored in the tote for display to user device 603.

System 600 may also comprise a network 602. Warehouse management system 119, user device 603, and database 604 may be connected and be able to communicate with each other via network 602. Network 602 may be one or more of a wireless network, a wired network or any combination of wireless network and wired network. For example, network 602 may include one or more of a fiber optic network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving data.

In addition, network 602 may include, but not be limited to, telephone lines, fiber optics, IEEE Ethernet 802.3, a wide area network ("WAN"), a local area network ("LAN"), or a global network such as the Internet. Also network 602 may support an Internet network, a wireless communication network, a cellular network, or the like, or any combination thereof. Network 602 may further include one network, or any number of the exemplary types of networks mentioned above, operating as a stand-alone network or in cooperation with each other. Network 602 may utilize one or more protocols of one or more network elements to which they are communicatively coupled. Network 602 may translate to or from other protocols to one or more protocols of network devices. Although network 602 is depicted as a single network, it should be appreciated that according to one or more embodiments, network 602 may comprise a plurality of interconnected networks, such as, for example, the Internet, a service provider's network, a cable television network, corporate networks, and home networks.

System 600 may also comprise a server (not shown). The server may be a web server. The server, for example, may include hardware (e.g., one or more computers, including processors, storage, and input/output devices) and/or software (e.g., one or more applications) that deliver web content that can be accessed by, for example a user through a network (e.g., network 602), such as the Internet. The server may use, for example, a hypertext transfer protocol (HTTP, sHTTP, or HTTPS) to communicate with a user. The web pages delivered to the user may include, for example, HTML documents, which may include images, style sheets, and scripts in addition to text content.

A user program such as, for example, a web browser, web crawler, or native mobile application, may initiate communication by making a request for a specific resource using HTTP and the server may respond with the content of that resource or an error message if unable to do so. The server also may enable or facilitate receiving content from the user so the user may be able to, for example, submit web forms, including uploading of files. The server may also support server-side scripting using, for example, Active Server Pages (ASP), PHP, or other scripting languages. Accordingly, the behavior of the server can be scripted in separate files, while the actual server software remains unchanged.

In other embodiments, the server may be an application server, which may include hardware and/or software that is dedicated to the efficient execution of procedures (e.g., programs, routines, scripts) for supporting its applied applications. The server may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. The server may act as a set of components accessible through an API defined by the platform itself. For Web applications, these components may be performed in, for example, the same running environment as web servers, and application servers may support the construction of dynamic pages. Application servers also may implement services, such as, for example, clustering, fail-over, and load-balancing. In various embodiments, where application servers are Java application servers, the web servers may behave like an extended virtual machine for running applications, transparently handling connections to databases associated with a backend on one side, and, connections to the Web client on the other. In some embodiments, the server may be implemented within WMS 119.

System 600 may further comprise a user device 603. In some embodiments, system 600 may comprise two or more user devices 603. While FIG. 6 illustrates user device 603 as being remote from WMS 119, in some embodiments, user device 603 may be a user device within WMS 119. User device 603 may be any computer device, or communications device including, but not limited to, a server, a network appliance, a personal computer (PC), a workstation, a mobile device, a phone, a handheld PC, a personal digital assistant (PDA), a thin client, a tablet computer, a smartphone, a fat client, an Internet browser, or other device. User device 603 may also be a tablet computer. Non-limiting examples of a tablet computer include an iPad, Kindle Fire, Playbook, Touchpad, and the like.

User device 603 may comprise one or more processors 605. In some embodiments, one or more processors 605 may be configured to communicate, via network 602, information with one or more processors 601 of WMS 119. In some embodiments, for example, one or more processors 605 may be configured to send a tote identifier associated with a tote configured to store one or more products for transfer, a product identifier associated with each product for transfer, a container identifier associated with a container configured to store the tote, and a code associated with a vehicle for transferring the one or more products, via network 602, to one or more processors 601 of WMS 119. In some embodiments, one or more processors 605 may be configured to receive a user input or selection of a zone, such as zone 300, within FC 200 and/or an aisle within the zone. One or more processors 605 may then send the user input or selection to one or more processors 601 of WMS 119. Additionally or alternatively, one or more processors 605 may be configured to report transfer errors to one or more processors 601 of WMS 119.

Figure 7A:
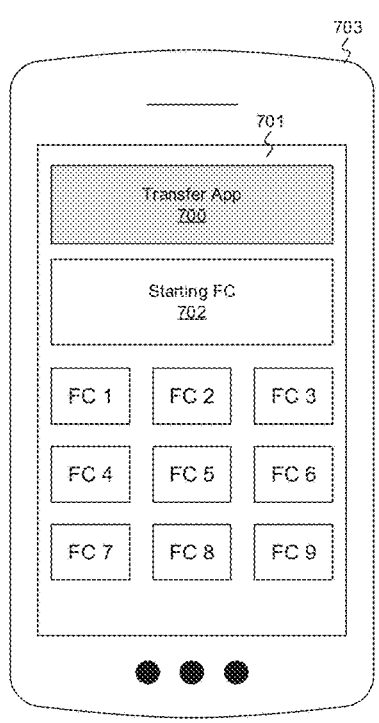
FIG. 7A is a diagrammatic illustration of an exemplary graphical user interface on a user device configured to facilitate inventory transfer, consistent with the disclosed embodiments.

FIGS. 7A-7F depict exemplary embodiments of graphical user interfaces (GUIs) 701 that may be presented to the user on user device 703 via transfer app 700. User device 703 may be implemented as user device 603 of FIG. 6, mobile device 403 of FIG. 4, and/or device 119B of FIG. 1A. In particular, FIG. 7A shows an example embodiment of an interface 701 on user device 703 configured to facilitate transfer of one or more products between FCs 200. For example, when a user, such as a worker, begins a picking operation (as illustrated in FIG. 4, for example) using user device 703, one or more processors 605 of user device 703 may be configured to request a starting FC 702 from the user. As such, one or more processors 605 may display on interface 701 of the transfer app 700 a plurality of FCs (FC 1 to FC 9 in FIG. 7A). The user of user device 703 may select one or more of the plurality of FCs displayed by, for example, touching, pressing, and/or clicking on one or more of the plurality of FCs displayed. Once the user selects an FC, among FC 1 to FC 9 displayed on interface 701, one or more processors 605 may automatically populate the selected FC as starting FC 702. One or more processors 605 may also send the selected FC to one or more processors 601 of WMS 119.

Figure 7B:
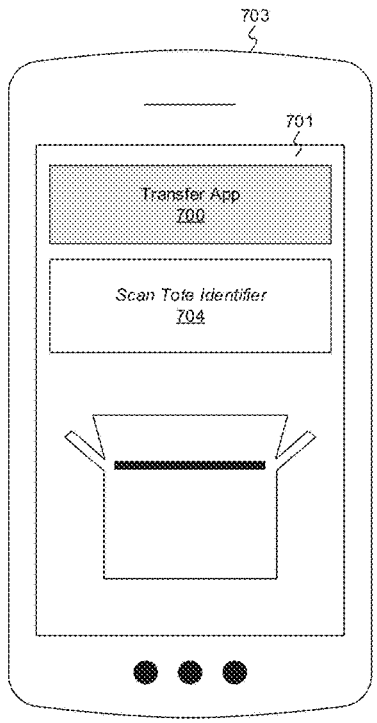
FIG. 7B is another diagrammatic illustration of the exemplary graphical user interface of FIG. 7A, consistent with the disclosed embodiments.
Figure 7C:
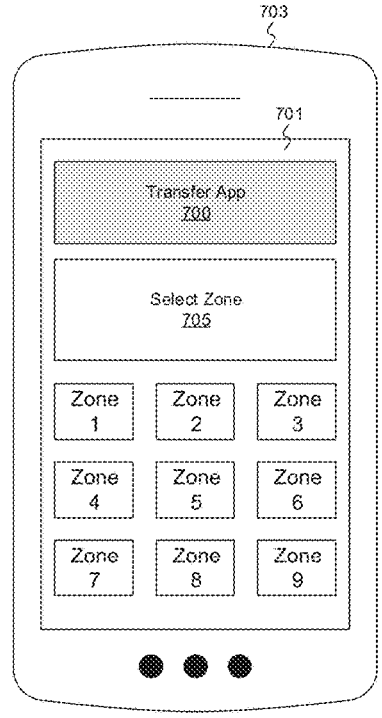
FIG. 7C is another diagrammatic illustration of the exemplary graphical user interface of FIG. 7A, consistent with the disclosed embodiments.

As seen in FIG. 7B, when the user selects starting FC 702 in interface 701 of user device 703, one or more processors 605 of user device 703 may display to the user instructions to scan a tote identifier 704 associated with a tote that the user will be using to store one or more products picked in starting FC 702. As discussed above, each tote, such as tote 507, may have a tote identifier 704 attached to the tote. Additionally or alternatively, the tote identifier 704 may not be attached to the tote, but instead, may be located near the tote. The tote identifier 704 may comprise one or more of an item barcode, an RFID tag, a matrix barcode, such as Quick Response (QR) code, or the like. As such, the user may use a camera or a sensor located on user device 703 to scan the tote identifier 704. Once the user scans the tote identifier 704, one or more processors 605 may automatically populate the scanned tote identifier 704 on interface 701.

When one or more processors 605 receives the scanned tote identifier 704, one or more processors 605 may send the scanned tote identifier 704 to one or more processors 601 of WMS 119. When one or more processors 601 of WMS 119 receives the scanned tote identifier 704, one or more processors 601 may modify a database, such as database 604, to assign the starting FC 702 to the tote identifier 704. As such, when the tote associated with the tote identifier 704 is transferred to another FC 200, the database 604 will monitor the starting FC 702, from which the tote was transferred.

After the user has scanned the tote identifier 704, one or more processors 605 may further prompt the user, on interface 701, to select a zone 705 within starting FC 702, at which the user will begin picking one or more products for transfer. The zone 705 may be similar to zone 300 in FIG. 3. As such, one or more processors 605 may display on interface 701 of the transfer app 700 a plurality of zones (Zone 1-Zone 9) within starting FC 702 selected by the user in FIG. 7A. While FIG. 7C displays 9 zones within starting FC 702, this is not limiting, and one or more processors 605 may display on interface 701 a list of all zones in the selected starting FC 702. The user of user device 703 may select one or more of the plurality of zones displayed by, for example, touching, pressing, and/or clicking on one or more of the plurality of zones displayed. Once the user selects a zone, among Zone 1 to Zone 9 displayed on interface 701, one or more processors 605 may automatically populate the selected zone 705 on interface 701. One or more processors 605 may also send the selected zone 705 to one or more processors 601 of WMS 119. When one or more processors 601 of WMS 119 receives the selected zone 705, one or more processors 601 may modify the database 604 to assign the selected zone 705 to the tote identifier 704.

Figure 7D:
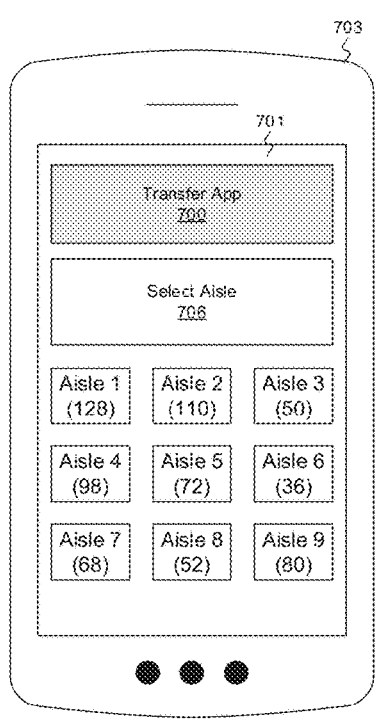
FIG. 7D is another diagrammatic illustration of the exemplary graphical user interface of FIG. 7A, consistent with the disclosed embodiments.

Referring now to FIG. 7D, after the user selected zone 705, one or more processors 605 may further prompt the user, on interface 701, to select an aisle 706 within the selected zone 705, at which the user will begin picking one or more products for transfer. Each zone may comprise one or more aisles. As such, one or more processors 605 may display on interface 701 of the transfer app 700 a plurality of aisles (Aisle 1-Aisle 9) within the zone 705 selected by the user in FIG. 7C. While FIG. 7D displays 9 aisles within the selected zone 705, this is not limiting, and one or more processors 605 may display on interface 701 a list of all aisles in the selected zone 705. The user of user device 703 may select one or more of the plurality of aisles displayed by, for example, touching, pressing, and/or clicking on one or more of the plurality of aisles displayed. Once the user selects an aisle, among Aisle 1 to Aisle 9 displayed on interface 701, one or more processors 605 may automatically populate the selected aisle 706 on interface 701. One or more processors 605 may also send the selected aisle 706 to one or more processors 601 of WMS 119. When one or more processors 601 of WMS 119 receives the selected aisle 706, one or more processors 601 may modify the database 604 to assign the selected aisle 706 to the tote identifier 704.

In some embodiments, one or more processors 605 may also display, on interface 701, an expected quantity of products for picking at each aisle. As seen in FIG. 7D, for example, one or more processors 605 may display that there are 128 products for picking at Aisle 1, 110 products for picking at Aisle 2, 50 products for picking at Aisle 3, 98 products for picking at Aisle 4, 72 products for picking at Aisle 5, 36 products for picking at Aisle 6, 68 products for picking at Aisle 7, 52 products for picking at Aisle 8, and 80 products for picking at Aisle 9. One or more processors 601, for example, may retrieve, from database 604, an expected quantity of products for picking at each aisle within selected zone 705. One or more processors 601 may send this information to one or more processors 605 for display on interface 701. The user may, for example, select an aisle 706 based on the expected quantity of products for picking at each aisle.

Once the user has selected a starting FC 702, a zone 705, and an aisle 706, the user may begin picking products and storing the picked products in the tote associated with the tote identifier 704. In some embodiments, one or more processors 601 may send instructions to one or more processors 605 to prompt the user to scan a location identifier associated with the selected aisle 706. For example, each aisle within the selected zone 705 may have a location identifier, such as physical location identifier 302, attached to or placed near the aisle. One or more processors 605 may prompt the user to scan the location identifier associated with the selected aisle 706 and one or more processors 605 may send the scanned location identifier to one or more processors 601. One or more processors 601 may compare the scanned location identifier to a location identifier associated with the selected aisle 706 in database 604. Based on the comparison, one or more processors 601 may confirm whether the user is picking products in the correct aisle 706. If the location identifiers do not match, one or more processors 601 may send instructions to one or more processors 605 to display a prompt on interface 701 to re-scan the location identifier until the scanned location identifier matches the location identifier associated with the selected aisle 706 in database 604.

In some embodiments, the user may not be able to scan the location identifier because the location identifier does not exist or is damaged, for example. In some embodiments, one or more processors 605 may display, on interface 701, a user activatable button (not shown) that the user can click if the location identifier cannot be scanned. If one or more processors 605 receives a notification that the location identifier cannot be scanned (e.g., the user clicks on the user activatable button), one or more processors 605 may send this information to one or more processors 601. One or more processors 601 may then select a second aisle within the selected zone 705, at which the user may begin picking products for transfer. One or more processors 601 may send instructions to one or more processors 605 to display, on interface 701, a notification to the user to move to the second aisle to begin picking products for transfer. Additionally or alternatively, one or more processors 601 may modify the database to assign a location identifier error to the selected aisle 706.

Figure 7E:
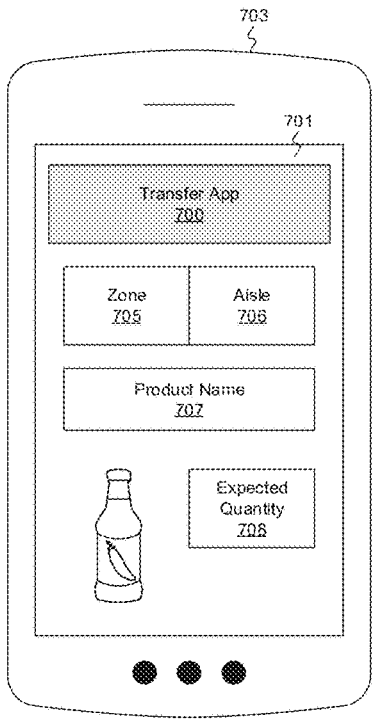
FIG. 7E is another diagrammatic illustration of the exemplary graphical user interface of FIG. 7A, consistent with the disclosed embodiments.

As seen in FIG. 7E, one or more processors 605 may display, on interface 701, a product name 707 associated with a product for picking at the selected aisle 706 and an expected quantity 708 of the product for picking by the user. In some embodiments, one or more processors 605 may display an image of the product on interface 701 as well so that the user can quickly identify the product in the selected aisle 706. In some embodiments, there may be more than one product for picking at the selected aisle 706. As such, one or more processors 601 may arbitrarily select a product from the selected aisle 706 for picking. In other embodiments, one or more processors 601 may select a product, from a plurality of products in the selected aisle 706, that has the highest expected quantity, has the highest customer demand, has the earliest expiration date or expiry date, has the earliest expected delivery date, or the like. That is, one or more processors 601 may aggregate information associated with each product in the selected aisle 706 from database 604 and determine which product to display on interface 701 for picking. Then, one or more processors 601 may send the selected product to one or more processors 605 for display on interface 701.

Figure 7F:
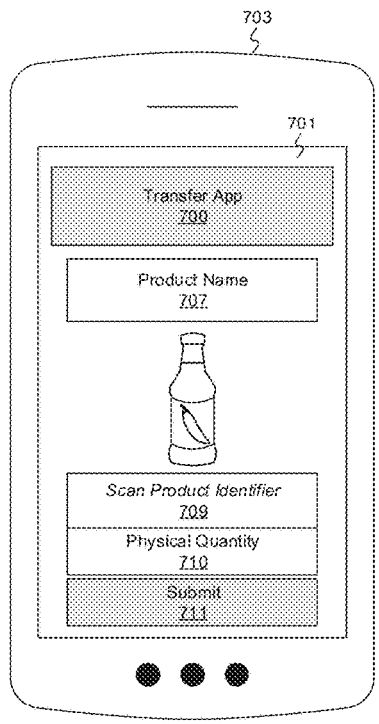
FIG. 7F is another diagrammatic illustration of the exemplary graphical user interface of FIG. 7A, consistent with the disclosed embodiments.

As seen in FIG. 7F, once one or more processors 601 displays the product name 707 of the product and the expected quantity 708 of the product for picking, one or more processors 605 may prompt the user to scan a product identifier 709 of the product to confirm that the user is picking the right product. Additionally, one or more processors 605 may prompt the user to input a physical quantity 710 of the product for storing in the tote associated with the tote identifier 704. Once the user has located the product in aisle 706, the user may scan a product identifier 709 and input a physical quantity 710 of the product for storing in the tote.

In some embodiments, one or more processors 605 may send the product identifier 709 scanned to one or more processors 601 of WMS 119. When one or more processors 601 receives the scanned product identifier 709, one or more processors 601 may determine whether the product associated with the scanned product identifier 709 matches the product associated with the product name 707. If they match, one or more processors 601 may allow the user to continue picking the product. If the products do not match, one or more processors 601 may send instructions to one or more processors 605 to display a prompt on interface 701 to re-scan the product identifier 709. One or more processors 601 may send instructions to one or more processors 605 to prevent the user from clicking on the submit button 711 (e.g., by graying out the submit button 711 such that the "Submit" button 711 is not activatable) until the product associated with the scanned product identifier 709 matches the product associated with the product name 707.

In some embodiments, the physical quantity 710 of the product for storing in the tote may be different from the expected quantity 708 of the product determined by one or more processors 601 of WMS 119. For example, there may not be enough space in the tote to store the expected quantity 708 of the product, there may be less than the expected quantity 708 of the product in the selected aisle 706, some of the products may be damaged, or the like. If the physical quantity 710 of the product input by the user on interface 701 is different from the expected quantity 708 of the product, one or more processors 601 may send instructions to one or more processors 605 to prompt the user, via interface 701, to identify a cause for the difference. For example, one or more processors 605 may display a prompt on interface 701 to select a cause for the difference in quantity. One or more processors 605 may display a list of causes, such as, for example, a lack of the product in the first zone, a lack of capacity in the tote, or product damage, and the user may select one of the displayed causes. Once the user has identified the cause for the difference, one or more processors 605 may send the cause to one or more processors 601 of WMS 119. One or more processors 601 may then modify database 604 to assign the cause to at least one of the product identifier 709 or the tote identifier 704. As such, when a user device in a destination FC receives less than an expected quantity 708 of the product, the user may scan at least one of the product identifier 709 or the tote identifier 704 and determine the cause for the difference.

Once the user has scanned the product identifier 709 and a physical quantity 710 of the product for storing in the tote associated with the tote identifier 704, the user may place the physical quantity 710 of the product in the tote and click the "Submit" button 711. One or more processors 605 may, then, send this information to one or more processors 601, and one or more processors 601 may modify database 604 to assign the product identifier 709 and the physical quantity 710 to the tote identifier 704.

Figure 8A:
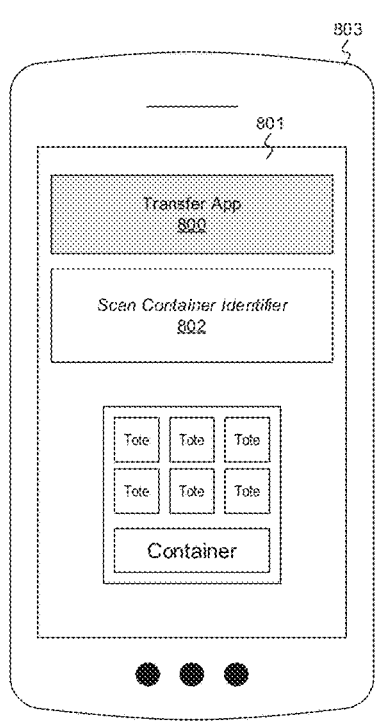
FIG. 8A is another diagrammatic illustration of an exemplary graphical user interface on a user device configured to facilitate inventory transfer, consistent with the disclosed embodiments.
Figure 8B:
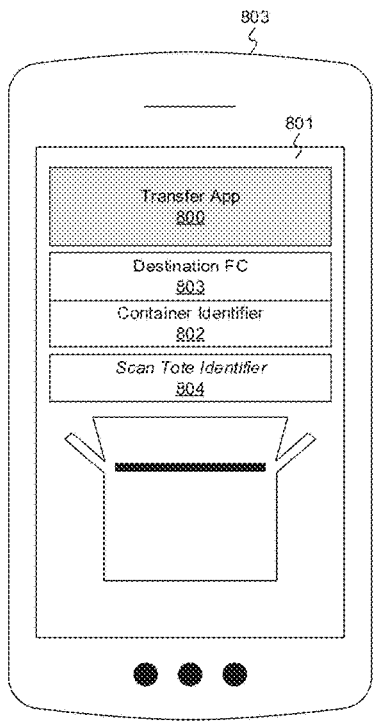
FIG. 8B is another diagrammatic illustration of the exemplary graphical user interface of FIG. 8A, consistent with the disclosed embodiments.
Figure 8C:
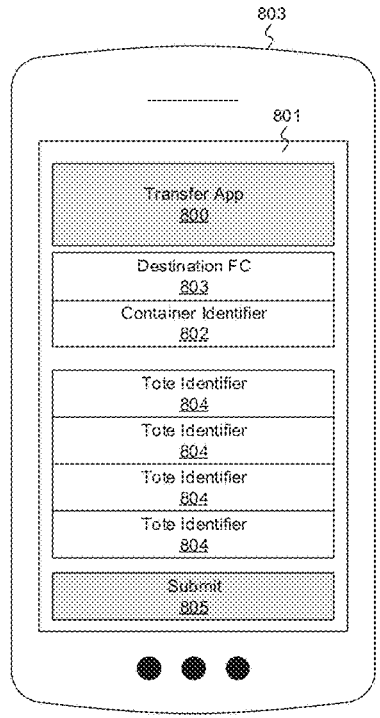
FIG. 8C is another diagrammatic illustration of the exemplary graphical user interface of FIG. 8A, consistent with the disclosed embodiments.

FIGS. 8A-8C depict exemplary embodiments of graphical user interfaces (GUIs) 801 that may be presented to the user on user device 803 via transfer app 800. User device 803 may be implemented as user device 703 of FIGS. 7A-7F, user device 603 of FIG. 6, mobile device 403 of FIG. 4, and/or device 119B of FIG. 1A. Transfer app 800 may be implemented as transfer app 700 of FIGS. 7A-7F. In particular, FIG. 8A shows an exemplary embodiment of an interface 801 on user device 803 configured to facilitate transfer of one or more products between FCs 200.

As discussed with reference in FIGS. 7A-7F, the user may begin picking one or more products for transfer using transfer app 700 and store the picked product(s) in a tote. Once the user has finished picking products for transfer and storing the products in one or more totes, the user may use transfer app 800 to begin placing the one or more totes into a container for transfer to a destination FC. Additionally or alternatively, the one or more totes may be transferred to a destination FC without placing the one or more totes into a container. That is, in some embodiments, the one or more totes may be transferred to a destination FC individually without being grouped into a container. If the one or more totes are being transferred to a destination FC without being placed in a container, the transfer app 800 may skip FIG. 8A and proceed to FIG. 8B.

As seen in FIG. 8A, for example, one or more processors 605 of user device 803 may display to the user instructions to scan a container identifier 802 associated with a container that the user will be using to store one or more totes. In other embodiments, if the one or more totes are being transferred individually without being placed into a container, one or more processors 605 may display to the user instructions to scan a tote identifier associated with each tote, instead of the container identifier 802. As discussed above, each container may have a container identifier 802 attached to the container. Additionally or alternatively, the container identifier 802 may not be attached to the container, but instead, may be located near the container. The container identifier 802 may comprise one or more of an item barcode, an RFID tag, a matrix barcode, such as Quick Response (QR) code, or the like. As such, the user may use a camera or a sensor located on user device 803 to scan the container identifier 802. Once the user scans the container identifier 802, one or more processors 605 may automatically populate the scanned container identifier 802 on interface 801.

When one or more processors 605 receives the scanned container identifier 802, one or more processors 605 may send the scanned container identifier 802 to one or more processors 601 of WMS 119. When one or more processors 601 of WMS 119 receives the scanned container identifier 802, one or more processors 601 may modify a database, such as database 604, to assign the starting FC 702 to the container identifier 802. As such, when the container associated with the container identifier 802 is transferred to another FC 200, the database 604 will monitor the starting FC 702, from which the container was transferred.

Referring now to FIG. 8B, one or more processors 605 may further prompt the user on interface 801 to input a destination FC 803. Similar to inputting the starting FC 702 in FIG. 7A, one or more processors 605 may display a plurality of FCs (such as FC 1 to FC 9 from FIG. 7A), from which the user may select a destination FC 803. The destination FC 803 may comprise an FC, among the plurality of FCs, to which the totes and the products stored in the container are transferred. Once the user selects a destination FC 803, one or more processors 605 may automatically populate the destination FC 803 on interface 801. One or more processors 605 may also display the container identifier 802 scanned in FIG. 8A. When one or more processors 605 receives the destination FC 803, one or more processors 605 may send this information to one or more processors 601 of WMS 119. One or more processors 601 may then modify database 604 to assign the destination FC 803 to the container identifier 802. In other embodiments, if the one or more totes are being transferred individually without being placed into a container, one or more processors 605 may not display any container identifier 802 on interface 801.

One or more processors 605 may also prompt the user to scan a tote identifier 804 associated with a tote that the user will be transferring to destination FC 803. In some embodiment, the tote may be placed into the container associated with the container identifier 802. As discussed above, each tote, such as tote 507, may have a tote identifier 804 attached to the tote. The tote identifier 804 may be the same as tote identifier 704. Additionally or alternatively, the tote identifier 804 may not be attached to the tote, but instead, may be located near the tote. The tote identifier 804 may comprise one or more of an item barcode, an RFID tag, a matrix barcode, such as Quick Response (QR) code, or the like. As such, the user may use a camera or a sensor located on user device 803 to scan the tote identifier 804. Once the user scans the tote identifier 804, one or more processors 605 may automatically populate the scanned tote identifier 804 on interface 801. When one or more processors 605 receives the scanned tote identifier 804, one or more processors 605 may send the scanned tote identifier 804 to one or more processors 601 of WMS 119. When one or more processors 601 of WMS 119 receives the scanned tote identifier 804, one or more processors 601 may modify a database, such as database 604, to assign the tote identifier 804 to the container identifier 802. In some embodiments, if the one or more totes are being transferred individually without being placed into a container, one or more processors 605 may not assign the tote identifier 804 to a container identifier in database 604.

In some embodiments, when one or more processors 601 receives the scanned tote identifier 804, one or more processors 601 may determine whether the destination FC 803 assigned to the container identifier 802 matches a destination FC assigned to the tote identifier 804 in database 604. For example, one or more processors 601 may have assigned a destination FC to the tote identifier 804 in database 604 when one or more processors 601 received the tote identifier 704 in FIG. 7B and when one or more processors 601 selected a product for transfer in FIG. 7E. As such, when one or more processors 601 receives the scanned tote identifier 804, one or more processors 601 may compare the destination FC 803 assigned to the container identifier 802 and the destination FC assigned to the tote identifier 804 in database 604 and determine whether the destination FCs match. Accordingly, one or more processors 601 may confirm that the tote associated with the tote identifier 804 and the container associated with the container identifier 802 are headed to the same destination FC 803. If one or more processors 601 determines that the destination FCs match, one or more processors 601 may modify database 604 to assign the tote identifier 804 to the container identifier 802. If, however, one or more processors 601 determines that the destination FCs do not match, one or more processors 601 may determine that the tote and the container are headed to different destination FCs and may not assign the tote identifier 804 to the container identifier 802 in database 604. Instead, one or more processors 601 may prompt the user to re-scan the tote identifier 804 until the destination FC 803 assigned to the container identifier 802 and the destination FC assigned to the tote identifier 804 in database 604 are identical.

In other embodiments, if the one or more totes are being transferred individually without being placed into a container, one or more processors 601 may assign the destination FC to the scanned tote identifier 804 and proceed to FIG. 8C.

Referring now to FIG. 8C, once the user has scanned tote identifiers 804 associated with every tote that will be transferred to destination FC 803, one or more processors 605 may display a list of all tote identifier 804 that are either assigned to the container identifier 802 or assigned to destination FC 803 (if the one or more totes are being transferred individually without being placed into a container). As such, the user may confirm that all totes that need to be placed in the container to be transferred to the destination FC 803 are scanned. After confirming, the user may click on the "Submit" button 805. After the user clicks on the "Submit" button 805, one or more processors 605 may send the information to one or more processors 601, and one or more processors 601 may determine that the user has finished placing all the totes into the container for transfer to the destination FC 803.

Figure 9A:
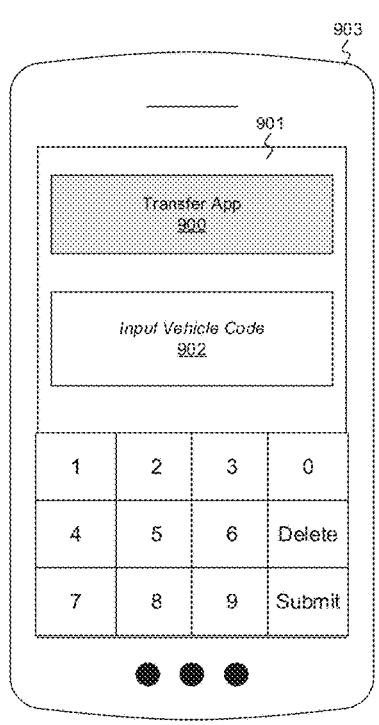
FIG. 9A is another diagrammatic illustration of an exemplary graphical user interface on a user device configured to facilitate inventory transfer, consistent with the disclosed embodiments.
Figure 9B:
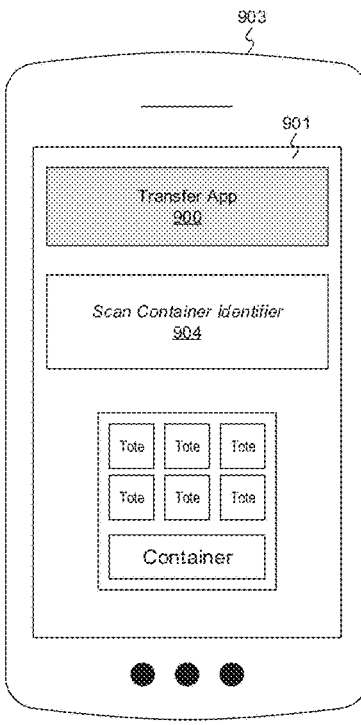
FIG. 9B is another diagrammatic illustration of the exemplary graphical user interface of FIG. 9A, consistent with the disclosed embodiments.
Figure 9C:
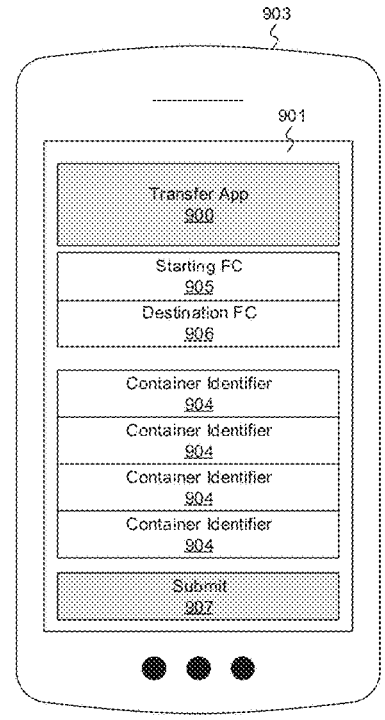
FIG. 9C is another diagrammatic illustration of the exemplary graphical user interface of FIG. 9A, consistent with the disclosed embodiments.

FIGS. 9A-9C depict exemplary embodiments of graphical user interfaces (GUIs) 901 that may be presented to the user on user device 903 via transfer app 900. User device 903 may be implemented as user device 803 of FIGS. 8A-8C, user device 703 of FIGS. 7A-7F, user device 603 of FIG. 6, mobile device 403 of FIG. 4, and/or device 119B of FIG. 1A. Transfer app 900 may be implemented as transfer app 800 of FIGS. 8A-8C and transfer app 700 of FIGS. 7A-7F. In particular, FIG. 9A shows an exemplary embodiment of an interface 901 on user device 903 configured to facilitate transfer of one or more products between FCs 200.

Once the user has placed all the totes into containers for transfer to the destination FC 803, the user may need to load the containers onto a vehicle, as illustrated in FIG. 5, in order to transfer the containers to the destination FC 803. In some embodiments, one or more processors 605 may prompt the user, via interface 901, to input a code 902 associated with the vehicle for transferring one or more containers storing products to the destination FC 803. The code 902, for example, may comprise numbers, letters, words, special characters, symbols, images, or any combination thereof that is specific to each vehicle and that identifies each vehicle. In some embodiments, the code may be attached to the vehicle or may be placed near the vehicle. For example, in some embodiments, the code may comprise a license plate number of the vehicle. As seen in FIG. 9A, the user may input the code 902 associated with the vehicle using a keypad displayed on interface 901.

As seen in FIG. 9B, after inputting the code 902, one or more processors 605 may prompt the user to begin scanning a container identifier 904 associated with each container that will be loaded onto the vehicle for transfer to the destination FC 803. In some embodiments, if the one or more totes are being transferred individually without being placed into a container, one or more processors 605 may prompt the user to begin scanning a tote identifier, such as tote identifier 804, associated with each tote that will be individually loaded onto the vehicle for transfer to the destination FC 803. Container identifier 904 may be the same as container identifier 802 of FIGS. 8A-8C. As discussed above, each container may have a container identifier 904 attached to the container. Additionally or alternatively, the container identifier 904 may not be attached to the container, but instead, may be located near the container. The container identifier 904 may comprise one or more of an item barcode, an RFID tag, a matrix barcode, such as Quick Response (QR) code, or the like. As such, the user may use a camera or a sensor located on user device 903 to scan the container identifier 904. Once the user scans the container identifier 904, one or more processors 605 may automatically populate the scanned container identifier 904 on interface 901.

When one or more processors 605 receives the scanned container identifier 904 and/or the scanned tote identifier, one or more processors 605 may send the scanned container identifier 904 and/or the scanned tote identifier to one or more processors 601 of WMS 119. When one or more processors 601 of WMS 119 receives the scanned container identifier 904 and/or the scanned tote identifier, one or more processors 601 may modify a database, such as database 604, to assign the container identifier 904 and/or one or more tote identifiers, such as tote identifiers 804 to the code 902 associated with the vehicle. One or more processors 601 may also modify database 604 to assign a timestamp of receiving the code 902 to the code 902. In some embodiments, one or more processors 601 may modify database 604 to assign a timestamp of assigning the container identifier 904 and/or one or more tote identifiers, such as tote identifiers 804, to the code 902 associated with the vehicle. As such, one or more processors 601 may monitor, in real-time, the time at which the one or more containers or totes are loaded onto the vehicle for transfer to the destination FC 803.

As seen in FIG. 9C, once the user has loaded all the containers onto the vehicle for transfer, one or more processors 605 may display on interface 901 details of the transfer, including but not limited to, starting FC 905 (which may be the same as starting FC 702, destination FC 906 (which may be the same as destination FC 803), a list of container identifiers 904 assigned to the code 902 of the vehicle, and/or a list of tote identifier (not shown) assigned to the code 902 of the vehicle. As such, the user may confirm that all of the containers and/or totes are loaded onto the vehicle for transfer from starting FC 905 to destination FC 906. Once the user has confirmed the details, the user may click on the "Submit" button 907 to transfer the containers and/or totes to the destination FC 906. In some embodiments, when user clicks on the "Submit" button 907, one or more processors 601 may modify database 604 to assign a timestamp of receiving the submission in order to monitor, in real-time, the time at which the one or more containers and/or totes have left starting FC 905 to be transferred to the destination FC 906.

Figure 10A:
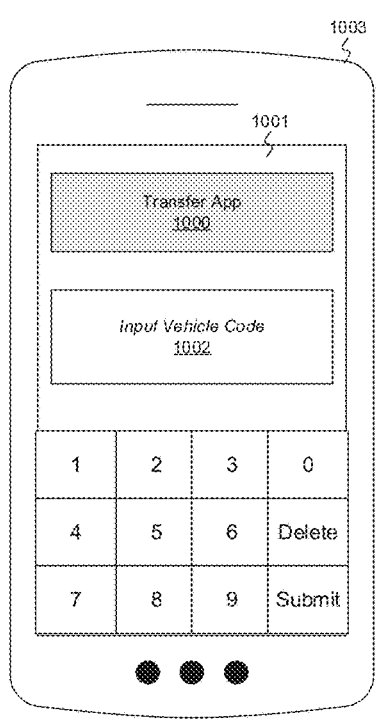
FIG. 10A is another diagrammatic illustration of an exemplary graphical user interface on a user device configured to facilitate inventory transfer, consistent with the disclosed embodiments.
Figure 10B:
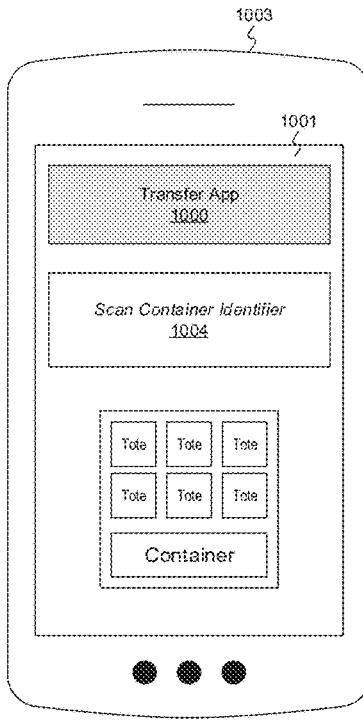
FIG. 10B is another diagrammatic illustration of the exemplary graphical user interface of FIG. 10A, consistent with the disclosed embodiments.
Figure 10C:
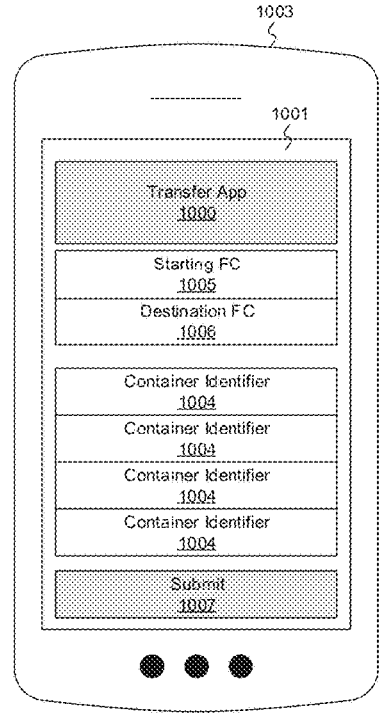
FIG. 10C is another diagrammatic illustration of the exemplary graphical user interface of FIG. 10A, consistent with the disclosed embodiments.

FIGS. 10A-10C depict exemplary embodiments of graphical user interfaces (GUIs) 1001 that may be presented to the user on user device 1003 via transfer app 1000. User device 1003 may be implemented as user device 903 of FIGS. 9A-9C. However, user device 903 associated with the starting FC, such as starting FC 905, and user device 1003 may be associated with the destination FC, such as destination FC 906. Transfer app 1000 may be implemented as transfer app 900 of FIGS. 9A-9C. In particular, FIG. 10A shows an exemplary embodiment of an interface 1001 on user device 1003 configured to facilitate transfer of one or more products between FCs 200.

After the vehicle arrives at a destination FC, such as destination FC 906, a user in the destination FC 906 may need to unload the containers, totes, and/or products from the vehicle in order to stow the products in the destination FC 906. As such, the user may use transfer app 1000 to begin the unloading operation. In some embodiments, to begin the unloading operation, one or more processors 605 of user device 1003 may prompt the user, via interface 1001, to input a code 1002 associated with the vehicle for transferring one or more containers and/or totes storing products to the destination FC 1006. The code 1002, for example, may comprise numbers, letters, words, special characters, symbols, images, or any combination thereof that is specific to each vehicle and that identifies each vehicle. As seen in FIG. 10A, the user may input the code 1002 associated with the vehicle using a keypad displayed on interface 1001.

As seen in FIG. 10B, after inputting the code 1002, one or more processors 605 may prompt the user to begin scanning a container identifier 1004 associated with each container that will be unloaded from the vehicle at the destination FC 1006. In some embodiments, if the one or more totes are being transferred individually without being placed into a container, one or more processors 605 may prompt the user to begin scanning a tote identifier, such as tote identifier 804, associated with each tote that will be individually unloaded from the vehicle at the destination FC 803. Container identifier 1004 may be the same as container identifier 904 of FIGS. 9A-9C. As discussed above, each container may have a container identifier 1004 attached to the container. Additionally or alternatively, the container identifier 1004 may not be attached to the container, but instead, may be located near the container. The container identifier 1004 may comprise one or more of an item barcode, an RFID tag, a matrix barcode, such as Quick Response (QR) code, or the like. As such, the user may use a camera or a sensor located on user device 1003 to scan the container identifier 1004. Once the user scans the container identifier 1004, one or more processors 605 may automatically populate the scanned container identifier 1004 on interface 901.

When the one or more processors 605 receives the code 1002, receives the container identifier 1004 from the user, and/or receives the tote identifier from the user, one or more processors 605 may send a timestamp of receiving the code 1002, the container identifier 1004, and/or the tote identifier to one or more processors 601. One or more processors 601 may modify a database, such as database 604, to assign the timestamp of receiving the code 1002, the container identifier 1004, and/or the tote identifier from the user device 1003 associated with the destination FC. As such, one or more processors 601 may monitor, in real-time, the time at which the one or more containers and/or totes are unloaded from the vehicle at the destination FC 1006.

When one or more processors 605 receives the scanned container identifier 1004 and/or the scanned tote identifier, one or more processors 605 may automatically populate the scanned container identifier 1004 and/or the scanned tote identifier on interface 1001. In addition, one or more processors 605 may send the code 1002, the scanned container identifier 1004, and/or the scanned tote identifier to one or more processors 601 of WMS 119. When one or more processors 601 of WMS 119 receives the code 1002, the scanned container identifier 1004, and/or the scanned tote identifier, one or more processors 601 may look up the code 1002 in a database, such as database 604, to retrieve a list of container identifiers or a list of tote identifier assigned to the code 1002 to confirm that the scanned container identifier 1004 and/or the scanned tote identifier matches one of the container identifiers and/or tote identifier assigned to the code 1002, respectively.

As seen in FIG. 10C, once the user has unloaded all the containers and/or totes from the vehicle at destination FC 1006, one or more processors 605 may display on interface 1001 details of the transfer, including but not limited to, starting FC 1005 (which may be the same as starting FC 905, destination FC 1006 (which may be the same as destination FC 906), a list of container identifiers 1004 assigned to the code 1002 of the vehicle, and/or a list of tote identifier (not shown) assigned to the code 1002 of the vehicle. As such, the user may confirm that all of the containers and/or totes are unloaded from the vehicle and transferred to destination FC 1006. Once the user has confirmed the details, the user may click on the "Submit" button 1007 to complete the transfer of products to the destination FC 1006. In some embodiments, when user clicks on the "Submit" button 1007, one or more processors 601 may modify database 604 to assign a timestamp of receiving the submission in order to monitor, in real-time, the time at which the one or more containers and/or totes have arrived at the destination FC 1006 from the starting FC 1005. As discussed with reference to FIG. 5, once the containers and/or totes have been unloaded at destination FC 1006, a user, such as a stowing worker, may begin a stowing operation to stow the products stored in the containers and/or the totes in one or more zones within the destination FC 1006.

Figure 11:
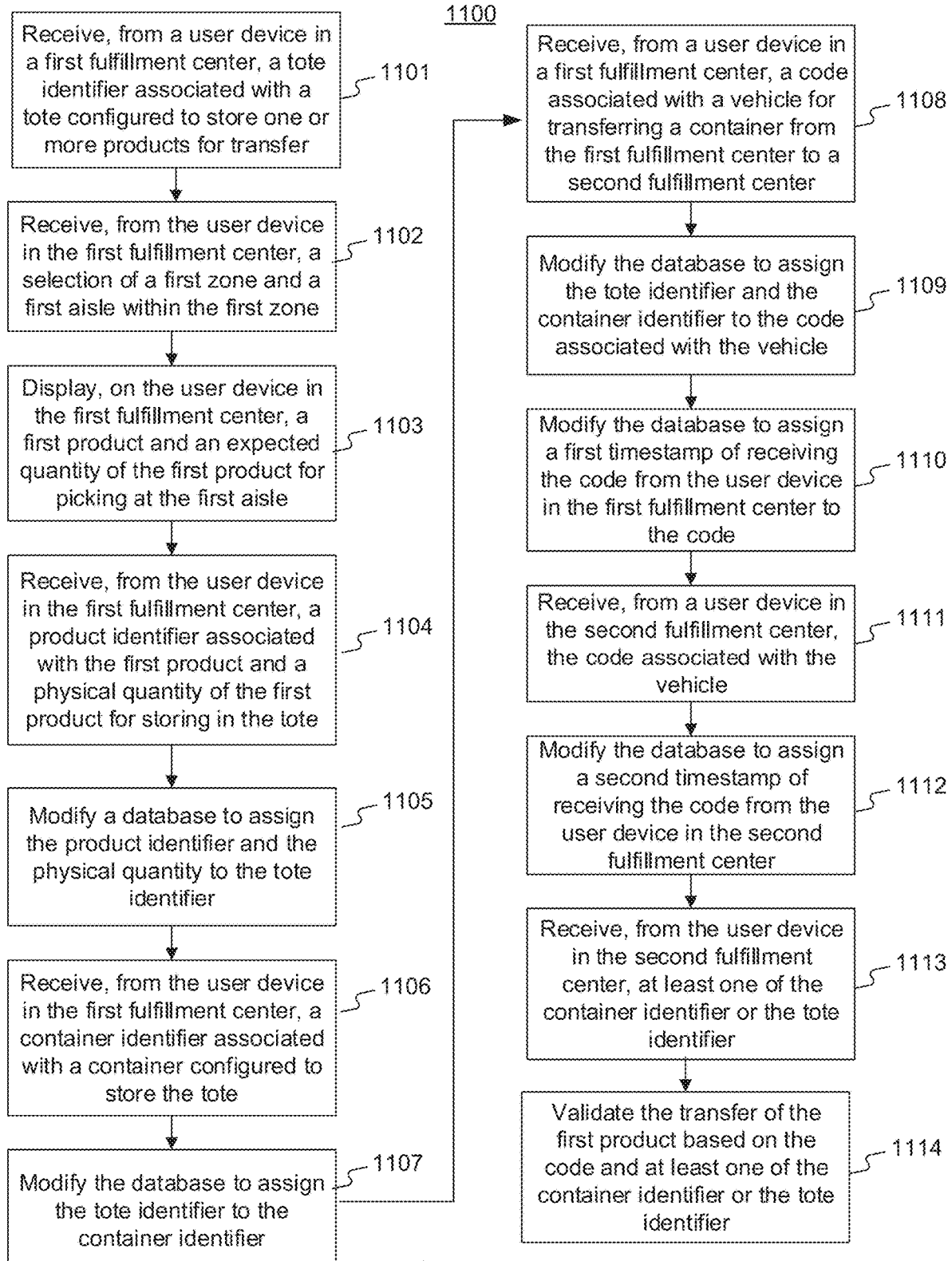
FIG. 11 is a flowchart illustrating an exemplary embodiment of a method for monitoring inventory transfer, consistent with the disclosed embodiments.

FIG. 11 is a flow chart illustrating an exemplary method 1100 for monitoring inventory transfer. This exemplary method is provided by way of example. Method 1100 shown in FIG. 11 can be executed or otherwise performed by one or more combinations of various systems. Method 1100 as described below may be carried out by WMS 119 and/or user device 603, as shown in FIG. 6, by way of example. While various elements of WMS 119 are referenced in explaining the method of FIG. 11, it should be noted that various elements of user device 603 may carry out the method of FIG. 11. Each block shown in FIG. 11 represents one or more processes, methods, or subroutines in the exemplary method 1100. Referring to FIG. 11, exemplary method 1100 may begin at block 1101.

At block 1101, one or more processors 601 may receive, from a user device in a first fulfillment center (e.g., user device 703, 803, or 903), a tote identifier associated with a tote configured to store one or more products for transfer. As discussed above, each tote may have a tote identifier, such as tote identifier 704, attached to the tote. Additionally or alternatively, the tote identifier may not be attached to the tote, but instead, may be located near the tote. The tote identifier may comprise one or more of an item barcode, an RFID tag, a matrix barcode, such as Quick Response (QR) code, or the like. As such, the user may use a camera or a sensor located on a user device to scan the tote identifier. Once the user scans the tote identifier, one or more processors 601 may receive the scanned tote identifier.

After receiving the tote identifier, method 1100 may proceed to block 1102, at which one or more processors 601 may receive, from the user device in the first fulfillment center, a selection of a first zone and a first aisle within the first zone for picking one or more products for inventory transfer. As discussed with reference to FIGS. 7A-7F, the user may select a starting FC, a zone within the starting FC, and an aisle within the selected zone to begin a picking operation. The user may use a transfer app, such as transfer app 700, to select the first zone and the first aisle.

In addition, at block 1103, one or more processors 601 may display, on the user device in the first fulfillment center, a first product and an expected quantity of the first product for picking in the first aisle selected by the user. As discussed with reference to FIG. 7E, one or more processors 601 may display an image of the product on the user device as well so that the user can quickly identify the product in the first aisle. In some embodiments, there may be more than one product for picking at the first aisle. In some embodiments, one or more processors 601 may arbitrarily select a product from the first aisle for picking. In other embodiments, one or more processors 601 may select a product, from a plurality of products in the first aisle, that has the highest expected quantity, has the highest customer demand, has the earliest expiration date or expiry date, has the earliest expected delivery date, or the like. That is, one or more processors 601 may aggregate information associated with each product in the first aisle from database 604 and determine which product to display on the user device for picking.

Method 1100 may then proceed to block 1104, at which one or more processors 601 may receive, from the user device in the first fulfillment center, a product identifier associated with the first product and a physical quantity of the first product for storing in the tote. For example, the user may locate the product in the first aisle and scan a product identifier associated with the product. As discussed above, each product may have a product identifier, such as product identifier 709, attached to the product. Additionally or alternatively, the product identifier may not be attached to the product, but instead, may be located near the product. The product identifier may comprise one or more of an item barcode, an RFID tag, a matrix barcode, such as Quick Response (QR) code, or the like. As such, the user may use a camera or a sensor located on a user device to scan the product identifier. Once the user scans the product identifier, one or more processors 601 may receive the scanned product identifier. In addition, the user may input a physical quantity, such as physical quantity 710, of the product for storing in the tote. In some embodiments, the physical quantity of the product for storing in the tote may be different from the expected quantity of the product. For example, there may not be enough space in the tote to store the expected quantity of the product, there may be less than the expected quantity of the product in the first aisle, some of the products may be damaged, or the like.

Once one or more processors 601 receives a product identifier associated with the first product and a physical quantity of the first product, method 1100 may proceed to block 1105. At block 1105, one or more processors 601 may modify the database, such as database 604, to assign the product identifier and the physical quantity to the tote identifier. As such, when the tote identifier is scanned by a user device, one or more processors 601 may retrieve a list of product identifiers assigned to the tote identifier and determine a list of products that are stored in the tote. One or more processors 601 may also be able to retrieve the physical quantity of each product that is stored in the tote.

Method 1100 may then proceed to block 1106, at which one or more processors 601 may receive, from the user device in the first fulfillment center, a container identifier associated with a container configured to store the tote. For example, once the user has finished picking products for transfer and storing the products in one or more totes, the user may begin placing the one or more totes into a container for transfer to a destination FC. As such, the user may scan a container identifier associated with a container that the user will be using to store one or more totes. As discussed above, however, in some embodiments, the one or more totes may be transferred to a destination FC without being placed into a container. That is, in some embodiments, the one or more totes may be transferred individually to a destination FC without being placed into a container. In that case, method 1100 may skip blocks 1106 and 1107 and proceed to step 1108. As discussed above, each container may have a container identifier, such as container identifier 802, attached to the container. Additionally or alternatively, the container identifier may not be attached to the container, but instead, may be located near the container. The container identifier may comprise one or more of an item barcode, an RFID tag, a matrix barcode, such as Quick Response (QR) code, or the like. As such, the user may use a camera or a sensor located on user device to scan the container identifier. Once the user scans the container identifier, method 1100 may proceed to block 1107, at which one or more processors 601 may receive the scanned container identifier and may modify a database, such as database 604, to assign the tote identifier to the container identifier.

Method 1100 may further proceed to block 1108, at which one or more processors 601 may receive, from a user device in the first fulfillment center, a code associated with a vehicle for transferring the container from the first fulfillment center (e.g., starting FC) to a second fulfillment center (e.g., a destination FC). For example, a user, such as a worker, may load each container onto a vehicle, as illustrated in FIG. 5, in order to transfer the containers from the first fulfillment center to the second fulfillment center. The code, for example, may comprise numbers, letters, words, special characters, symbols, images, or any combination thereof that is specific to each vehicle and that identifies each vehicle. In some embodiments, the code associated with the vehicle may comprise the license plate number of the vehicle.

In some embodiments, if one or more totes are being transferred individually without being placed in a container, at block 1108, one or more processors 601 may receive from a user device in the first fulfillment center, a code associated with a vehicle for transferring the tote from the first fulfillment center (e.g., starting FC) to a second fulfillment center (e.g., a destination FC).

After one or more processors 601 receives the code associated with the vehicle for transferring the container to the second fulfillment center, method 1100 may proceed to block 1109. At block 1109, one or more processors 601 may modify database 604 to assign the tote identifier (from block 1101) and the container identifier (from block 1106) to the code associated with the vehicle. In some embodiments, if one or more totes are being transferred individually without being placed in a container, at block 1109, one or more processors 601 may modify database 604 to assign only the tote identifier (from block 1101) to the code associated with the vehicle.

At block 1110, one or more processors 601 may further modify database 604 to assign a first timestamp of receiving the code from the user device in the first fulfillment center to the code. As such, one or more processors 601 may monitor, in real-time, the time at which the one or more containers are loaded onto the vehicle for transfer to the second fulfillment center.

Method 1100 may further proceed to block 1111, at which one or more processors 601 may receive, from a user device in the second fulfillment center, the code associated with the vehicle. For example, after the vehicle has arrived at the fulfillment center, a user, such as a worker, may use a user device to begin an unloading operation. The user may begin unloading one or more containers and/or totes from the vehicle. In order to begin the unloading operation, the user may first input the code associated with the vehicle that arrived at the second fulfillment center.

After receiving the code associated with the vehicle from a user device in the second fulfillment center, method 1100 may proceed to block 1112. At block 1112, one or more processors 601 may modify database 604 to assign a second timestamp of receiving the code from the user device in the second fulfillment center. As such, one or more processors 601 may monitor, in real-time, the time at which the one or more containers are unloaded from the vehicle at the destination FC 1006.

Method 1100 may further proceed to block 1113, at which one or more processors 601 may receive, from the user device in the second fulfillment center, at least one of the container identifier or the tote identifier. For example, during the unloading operation, the user may begin scanning a container identifier associated with each container unloaded from the vehicle and/or a tote identifier associated with each tote unloaded from the vehicle. The user may further stow one or more products stored within each tote and/or each container in the second fulfillment center.

Method 1100 may further proceed to block 1114, at which one or more processors 601 may validate the transfer of the first product based on the code and at least one of the container identifier or the tote identifier. For example, one or more processors 601 may look up a product identifier associated with the first product in database 604 and determine a container identifier and/or a tote identifier assigned to the product identifier. One or more processors 601 may further determine, from database 604, whether the code associated with a vehicle that is assigned to the container identifier and/or the tote identifier has been received from the first fulfillment center and from the second fulfillment center. If the code has been received from the first fulfillment center, one or more processors 601 may determine that the vehicle transferring the first product has left the first fulfillment center. If the code has been received from the second fulfillment center as well, one or more processors 601 may determine that the vehicle transferring the first product has arrived at the second fulfillment center, and thus, validate the transfer of the first product to the second fulfillment center. If the code has been received from the first fulfillment center and has not been received yet from the second fulfillment center, one or more processors 601 may determine that the vehicle transferring the first product has left the first fulfillment center, but is still on its way to the second fulfillment center.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/ AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for monitoring inventory transfer in real-time, the system comprising:
    a memory storing instructions; and
    at least one processor configured to execute the instructions to:
        receive, from a user device in a first fulfillment center, a tote identifier associated with a tote configured to store one or more products for transfer;
        receive, from the user device in the first fulfillment center, a selection of a first zone and a first aisle within the first zone to pick one or more products for transfer;
        prompt a user of the user device in the first fulfillment center to scan a location identifier affixed to the first aisle, wherein the user of the user device is a worker assigned to the first fulfillment center to stow products or retrieve products for shipping to customers;
        upon a confirmation that the scanned location identifier affixed to the first aisle matches an actual location identifier associated with the first aisle in a database, send for display to the user device in the first fulfillment center a first product and an expected quantity of the first product for picking, by the user, at the first aisle;
        receive, from the user device in the first fulfillment center, a product identifier associated with the first product and a physical quantity of the first product for storing in the tote;
        modify the database to assign the product identifier and the physical quantity to the tote identifier;
        receive, from the user device in the first fulfillment center, a container identifier associated with a container configured to store the tote;
        modify the database to assign the tote identifier to the container identifier;
        receive, from the user device in the first fulfillment center, a code associated with a vehicle for transferring the container from the first fulfillment center to the second fulfillment center;
        modify the database to assign the tote identifier and the container identifier to the code associated with the vehicle;
        modify the database to assign a first timestamp of receiving the code from the user device in the first fulfillment center to the code;
        receive, from a user device in the second fulfillment center, the code associated with the vehicle;
        modify the database to assign a second timestamp of receiving the code from the user device in the second fulfillment center to the code;
        receive, from the user device in the second fulfillment center, at least one of the container identifier or the tote identifier; and
        validate the transfer of the first product from the first fulfillment center to the second fulfillment center, based on the code and at least one of the container identifier or the tote identifier received from the user device in the second fulfillment center.

2. The system of claim 1, wherein the at least one processor is further configured to execute the instructions to:
    receive, from the user device in the first fulfillment center, a notification that the location identifier affixed to the first aisle cannot be scanned; and
    send for display to the user device in the first fulfillment center a notification to move to a second aisle different from the first aisle.

3. The system of claim 2, wherein the at least one processor is further configured to modify the database to assign a location identifier error to the first aisle.

4. The system of claim 1, wherein, when the physical quantity of the product and the expected quantity of the product are different, the at least one processor is further configured to:
    prompt the user of the user device in the first fulfillment center to identify a cause for the difference; and
    modify the database to assign the cause to at least one of the product identifier or the tote identifier.

5. The system of claim 4, wherein the cause for the difference comprises at least one of a lack of the product in the first zone, a lack of capacity in the tote, or a product damage.

6. The system of claim 1, wherein the at least one processor is further configured to execute the instructions to display, on the user device in the first fulfillment center, a list of all tote identifiers assigned to the container identifier.

7. The system of claim 1, wherein, after receiving the tote identifier from the user device in the first fulfillment center, the at least one processor is further configured to execute the instructions to modify the database to assign the second fulfillment center as a final destination to the tote identifier.

8. The system of claim 7, wherein, after receiving the container identifier from the user device in the first fulfillment center, the at least one processor is further configured to execute the instructions to modify the database to assign the second fulfillment center as a final destination to the container identifier.

9. The system of claim 8, wherein modifying the database to assign the tote identifier to the container identifier comprises:
    comparing the final destination associated with the tote identifier and the final destination associated with the container identifier; and
    modifying the database to assign the tote identifier to the container identifier when the final destination associated with the tote identifier and the final destination associated with the container identifier are identical.

10. A computer-implemented method for monitoring inventory transfer in real-time, the method comprising:
    receiving, from a user device in a first fulfillment center, a tote identifier associated with a tote configured to store one or more products for transfer;

receiving, from the user device in the first fulfillment center, a selection of a first zone and a first aisle within the first zone to pick one or more products for transfer;

prompting a user of the user device in the first fulfillment center to scan a location identifier affixed to the first aisle, wherein the user of the user device is a worker assigned to the first fulfillment center to stow products or retrieve products for shipping to customers;

upon a confirmation that the scanned location identifier affixed to the first aisle matches an actual location identifier associated with the first aisle in a database, sending for display to the user device in the first fulfillment center a first product and an expected quantity of the first product for picking, by the user, at the first aisle;

receiving, from the user device in the first fulfillment center, a product identifier associated with the first product and a physical quantity of the first product for storing in the tote;

modifying the database to assign the product identifier and the physical quantity to the tote identifier;

receiving, from the user device in the first fulfillment center, a container identifier associated with a container configured to store the tote;

modifying the database to assign the tote identifier to the container identifier;

receiving, from the user device in the first fulfillment center, a code associated with a vehicle for transferring the container from the first fulfillment center to the second fulfillment center;

modifying the database to assign the tote identifier and the container identifier to the code associated with the vehicle;

modifying the database to assign a first timestamp of receiving the code from the user device in the first fulfillment center to the code;

receiving, from a user device in the second fulfillment center, the code associated with the vehicle;

modifying the database to assign a second timestamp of receiving the code from the user device in the second fulfillment center to the code;

receiving, from the user device in the second fulfillment center, at least one of the container identifier or the tote identifier; and validating the transfer of the first product from the first fulfillment center to the second fulfillment center, based on the code and at least one of the container identifier or the tote identifier received from the user device in the second fulfillment center.

11. The method of claim 10, further comprising:

receiving, from the user device in the first fulfillment center, a notification that the location identifier affixed to the first aisle cannot be scanned;

sending for display to the user device in the first fulfillment center a notification to move to a second aisle different from the first aisle; and modifying the database to assign a location identifier error to the first aisle.

12. The method of claim 10, further comprising:

when the physical quantity of the product and the expected quantity of the product are different, prompting the user of the user device in the first fulfillment center to identify a cause for the difference; and modifying the database to assign the cause to at least one of the product identifier or the tote identifier.

13. The method of claim 12, wherein the cause for the difference comprises at least one of a lack of the product in the first zone, a lack of capacity in the tote, or a product damage.

14. The method of claim 10, further comprising displaying, on the user device in the first fulfillment center, a list of all tote identifiers assigned to the container identifier.

15. The method of claim 10, further comprising modifying the database to assign the second fulfillment center as a final destination to the tote identifier after receiving the tote identifier from the user device in the first fulfillment center.

16. The method of claim 15, further comprising modifying the database to assign the second fulfillment center as a final destination to the container identifier after receiving the container identifier from the user device in the first fulfillment center.

17. The method of claim 16, wherein modifying the database to assign the tote identifier to the container identifier comprises:

comparing the final destination associated with the tote identifier and the final destination associated with the container identifier; and modifying the database to assign the tote identifier to the container identifier when the final destination associated with the tote identifier and the final destination associated with the container identifier are identical.

18. A computer-implemented system for monitoring inventory transfer in real-time, the system comprising:

a first user device in a first fulfillment center, the first user device being configured to display zones in the first fulfillment center, aisles in each zone, and an expected quantity of products to be picked in each aisle;

a second user device in a second fulfillment center;

a memory storing instructions; and at least one processor configured to execute the instructions to:

receive, from the first user device, a tote identifier associated with a tote configured to store one or more products for transfer;

modify the database to assign the second fulfillment center as a final destination to the tote identifier;

receive, from the first user device, a selection of a first zone and a first aisle within the first zone to pick one or more products for transfer;

prompt a user of the first user device to scan a location identifier affixed to the first aisle, wherein the user of the user device is a worker assigned to the first fulfillment center to stow products or retrieve products for shipping to customers;

upon a confirmation that the scanned location identifier affixed to the first aisle matches an actual location identifier associated with the first aisle in a database, send for display to the first user device a first product and an expected quantity of the first product for picking, by the user, at the first aisle;

receive, from the first user device, a product identifier associated with the first product and a physical quantity of the first product for storing in the tote;

modify the database to assign the product identifier and the physical quantity to the tote identifier;

receive, from first the user device, a container identifier associated with a container configured to store the tote;

modify the database to assign the second fulfillment center as a final destination to the container identifier;

modify the database to assign the tote identifier to the container identifier, wherein modifying the database to assign the tote identifier to the container identifier comprises:
   comparing the final destination associated with the tote identifier and the final destination associated with the container identifier; and
   modifying the database to assign the tote identifier to the container identifier when the final destination associated with the tote identifier and the final destination associated with the container identifier are identical;

receive, from the first user device, a code associated with a vehicle for transferring the container from the first fulfillment center to the second fulfillment center;

modify the database to assign the tote identifier and the container identifier to the code associated with the vehicle;

modify the database to assign a first timestamp of receiving the code from the user device in the first fulfillment center to the code;

receive, from the second user device, the code associated with the vehicle;

modify the database to assign a second timestamp of receiving the code from the second user device to the code;

receive, from the second user device, at least one of the container identifier or the tote identifier; and validate the transfer of the first product from the first fulfillment center to the second fulfillment center, based on the code and at least one of the container identifier or the tote identifier received from the second user device.

* * * * *